US010925387B2

(12) United States Patent
Nishiura et al.

(10) Patent No.: US 10,925,387 B2
(45) Date of Patent: Feb. 23, 2021

(54) TOOTHBRUSH MODULE, ATTACHMENT FOR TOOTHBRUSH, BRUSHING ASSISTANCE SYSTEM, BRUSHING EVALUATION SYSTEM, BRUSHING ASSISTANCE DEVICE, AND BRUSHING ASSISTANCE PROGRAM

(71) Applicant: SUNSTAR INC., Takatsuki (JP)

(72) Inventors: Masahiro Nishiura, Takatsuki (JP); Kosuke Torii, Takatsuki (JP); Nobuharu Matsudomi, Takatsuki (JP); Yasuhiro Kawai, Takatsuki (JP); Hidekuni Takano, Takatsuki (JP)

(73) Assignee: SUNSTAR INC., Takatsuki (JP)

(*) Notice: Subject to any disclaimer, the term of this patent is extended or adjusted under 35 U.S.C. 154(b) by 137 days.

(21) Appl. No.: 15/533,851

(22) PCT Filed: Dec. 21, 2015

(86) PCT No.: PCT/JP2015/085705
§ 371 (c)(1),
(2) Date: Jun. 7, 2017

(87) PCT Pub. No.: WO2016/104442
PCT Pub. Date: Jun. 30, 2016

(65) Prior Publication Data
US 2017/0318954 A1 Nov. 9, 2017

(30) Foreign Application Priority Data

Dec. 22, 2014 (JP) .............................. JP2014-258559
Dec. 22, 2014 (JP) .............................. JP2014-258561

(51) Int. Cl.
A46B 15/00 (2006.01)
A46B 17/00 (2006.01)
(Continued)

(52) U.S. Cl.
CPC ............ *A46B 15/0006* (2013.01); *A46B 5/00* (2013.01); *A46B 15/0002* (2013.01);
(Continued)

(58) Field of Classification Search
None
See application file for complete search history.

(56) References Cited

U.S. PATENT DOCUMENTS 5,894,453 A 4/1999 Pond
2006/0040246 A1 2/2006 Ding
(Continued)

FOREIGN PATENT DOCUMENTS

CN 201700658 U 1/2011
CN 102046041 A 5/2011
(Continued)

OTHER PUBLICATIONS

Press Release, Vigilant Unveils Rainbow, The First Bluetooth Smart Toothbrush Connected to Smartphones, dated Apr. 30, 2014, Paris, France (14 Sheets).
(Continued)

*Primary Examiner* — Brian D Keller
(74) *Attorney, Agent, or Firm* — Kratz, Quintos & Hanson, LLP

(57) ABSTRACT

Provided are a toothbrush module, a toothbrush attachment, a brushing assistance system, a brushing evaluation system, a brushing assistance device, and a brushing assistance program that ease obtainment of a brushing action of a user even during brushing.
A toothbrush attachment (2) includes: a sensor unit (21) that detects a predetermined physical quantity; a wireless transmission unit (22) that transmits a radio signal indicating the physical quantity detected by the sensor unit (21); a housing unit (201) that houses the sensor unit (21) and the wireless
(Continued)

transmission unit (22); and a coupling mechanism (202) that removably attaches the housing unit (201) to a toothbrush (4). A wireless terminal device (3) includes a wireless receiver (31) that receives a radio signal and obtains the physical quantity, a music output unit (354) that outputs an image or sound so as to support brushing by a user with the toothbrush (4) based on the physical quantity, a figure display control unit (363), and a notification unit (373).

2 Claims, 31 Drawing Sheets

(51) Int. Cl.
  *A46B 5/00* (2006.01)
  *A61C 17/22* (2006.01)
(52) U.S. Cl.
  CPC ...... *A46B 15/0008* (2013.01); *A46B 15/0042* (2013.01); *A46B 15/0044* (2013.01); *A46B 17/00* (2013.01); *A61C 17/22* (2013.01); *A46B 2200/1066* (2013.01)

(56) References Cited

U.S. PATENT DOCUMENTS

| | | | |
|---|---|---|---|
| 2007/0136964 A1 | 6/2007 | Dawley | |
| 2007/0270221 A1* | 11/2007 | Park | A46B 15/0002 463/37 |
| 2009/0092955 A1 | 4/2009 | Hwang | |
| 2009/0143914 A1 | 6/2009 | Cook | |
| 2010/0281636 A1 | 11/2010 | Ortins | |
| 2011/0010876 A1 | 1/2011 | Iwahori | |
| 2011/0041269 A1 | 2/2011 | Iwahori | |
| 2012/0266397 A1 | 10/2012 | Iwahori | |
| 2015/0351883 A1* | 12/2015 | Hwang | A61C 17/221 15/22.1 |
| 2016/0235357 A1 | 8/2016 | Ohmer | |

FOREIGN PATENT DOCUMENTS

| | | |
|---|---|---|
| CN | 102427861 A | 4/2012 |
| EP | 3010370 A1 | 4/2016 |
| JP | 63-157337 U1 | 10/1988 |
| JP | H08-066238 A | 3/1996 |
| JP | 2005-235343 A | 9/2005 |
| JP | 2006-295753 A | 10/2006 |
| JP | 2008-543418 A1 | 12/2008 |
| JP | 2009-530043 A | 8/2009 |
| JP | 2009-240760 A1 | 10/2009 |
| JP | 4543663 B2 | 9/2010 |
| JP | 2011-139844 A1 | 7/2011 |
| JP | 2011-524756 A1 | 9/2011 |
| JP | 2012-154635 A | 8/2012 |
| JP | 2012-524643 A1 | 10/2012 |
| JP | 2012-526598 A1 | 11/2012 |
| JP | 2013-135913 A1 | 7/2013 |
| JP | 2014-204789 A | 10/2014 |
| WO | 2007/112112 A1 | 10/2007 |
| WO | 2009141489 A1 | 11/2009 |
| WO | 2010/134050 A1 | 11/2010 |
| WO | 2010129755 A1 | 11/2010 |
| WO | 2010134051 A1 | 11/2010 |
| WO | 2014202438 A1 | 12/2014 |
| WO | 2017029469 A1 | 2/2017 |

OTHER PUBLICATIONS

European Patent Office Third Party Observation for International Application No. 15873010.1 dated Jul. 2, 2018 (3 sheets).
International Search Report for International Application No. PCT/JP2015/085705 dated Mar. 29, 2016 (5 Sheets).
Kolibree Toothbrush, dated Dec. 21, 2014 (2 Sheets).
Anonymous; "Kolibree—Toothbrush"; Dec. 7, 2014; Retrieved from the Internet: URL: https://web.archive.org/web/20141207234007/http://www.kolibree.com:80/en/product/ (5 pages)/ Cited in Extended European Search Report.
Thierry Daher; "Kolibree—The world's first intelligent toothbrush"; Apr. 10, 2014; Youtube; Retrieved from the Internet: URL: https://www.youtube.com/watch?v=17Pb9hQkdb4 (4 pages)/Cited in Extended European Search Report.
Extended European Search Report for European Patent Application No. 18168324.4 dated Dec. 5, 2018 (12 pages).

* cited by examiner

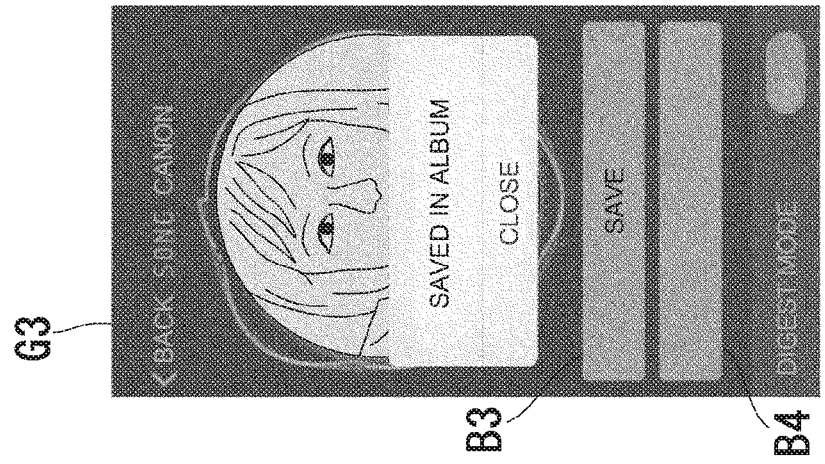
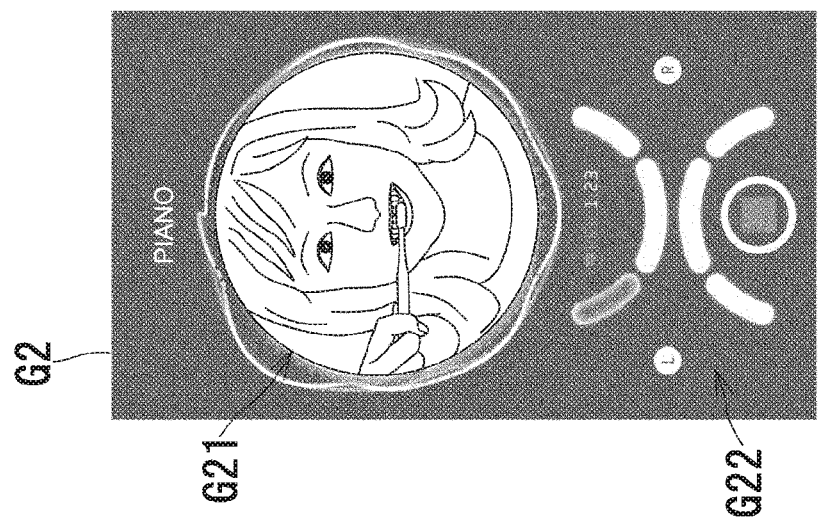
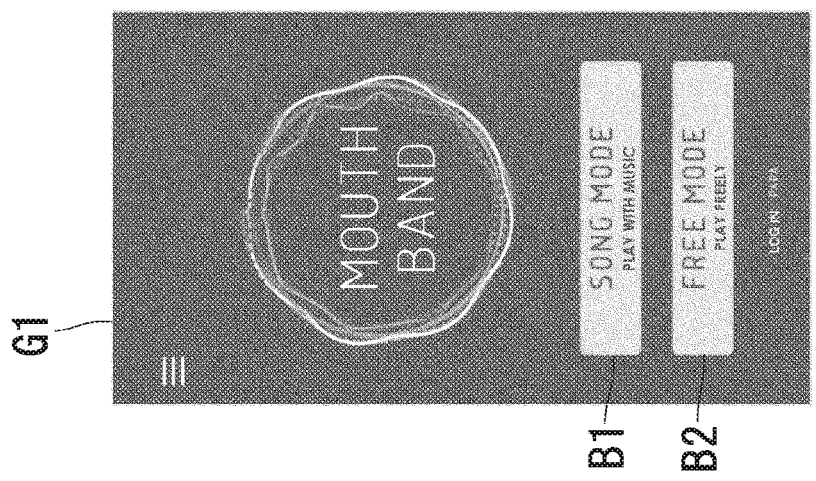
FIG. 11 (a)  FIG. 11 (b)  FIG. 11 (c)

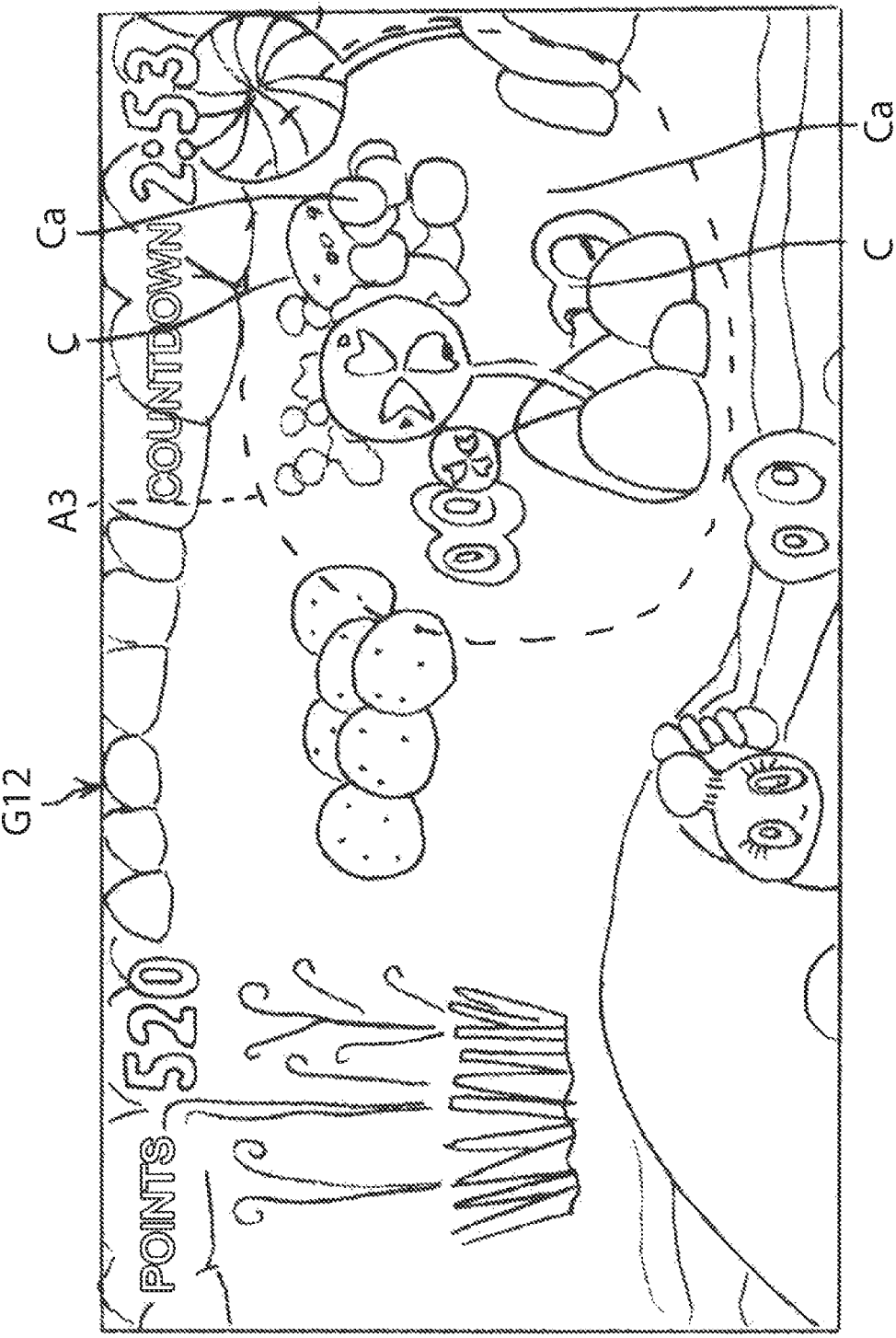

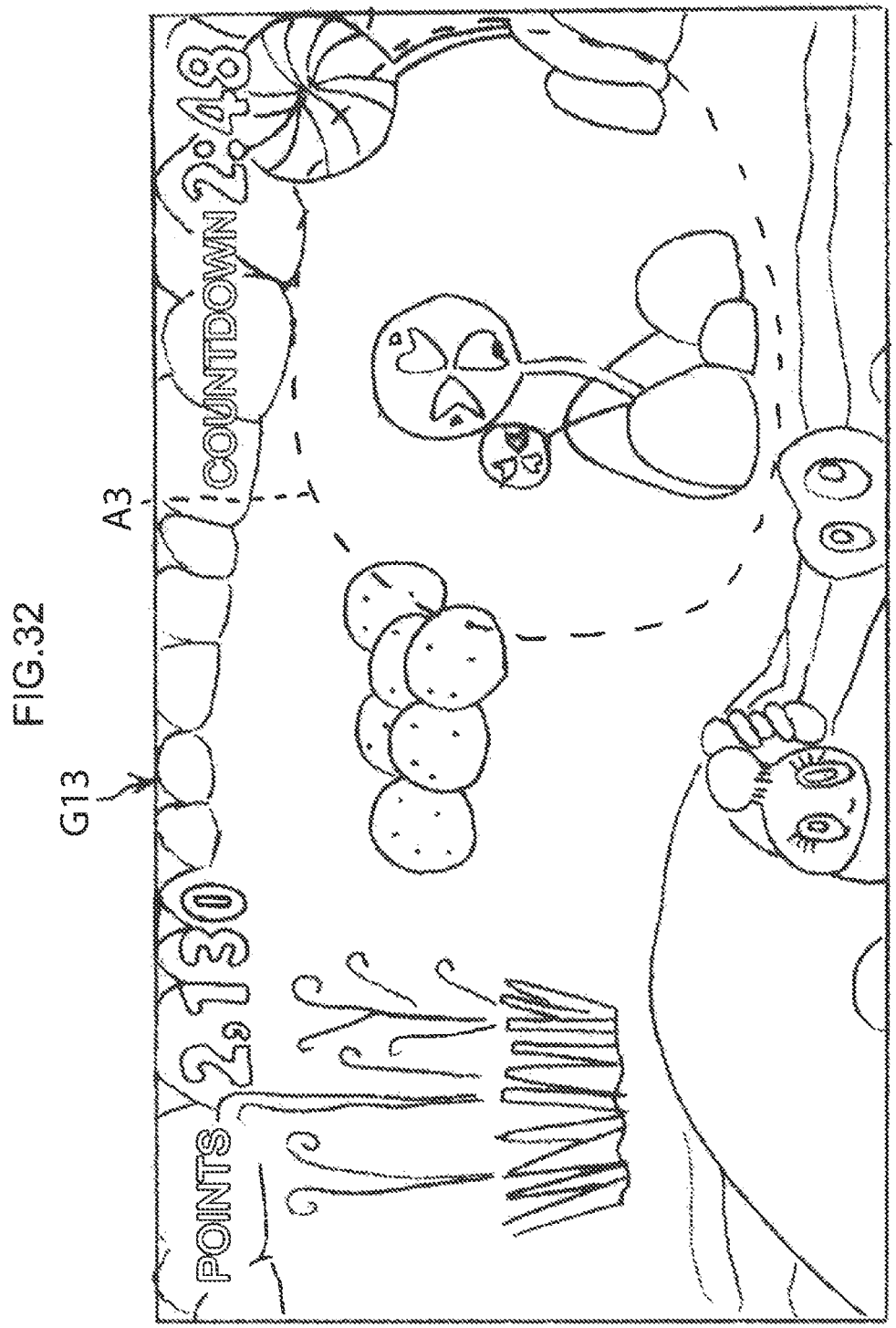

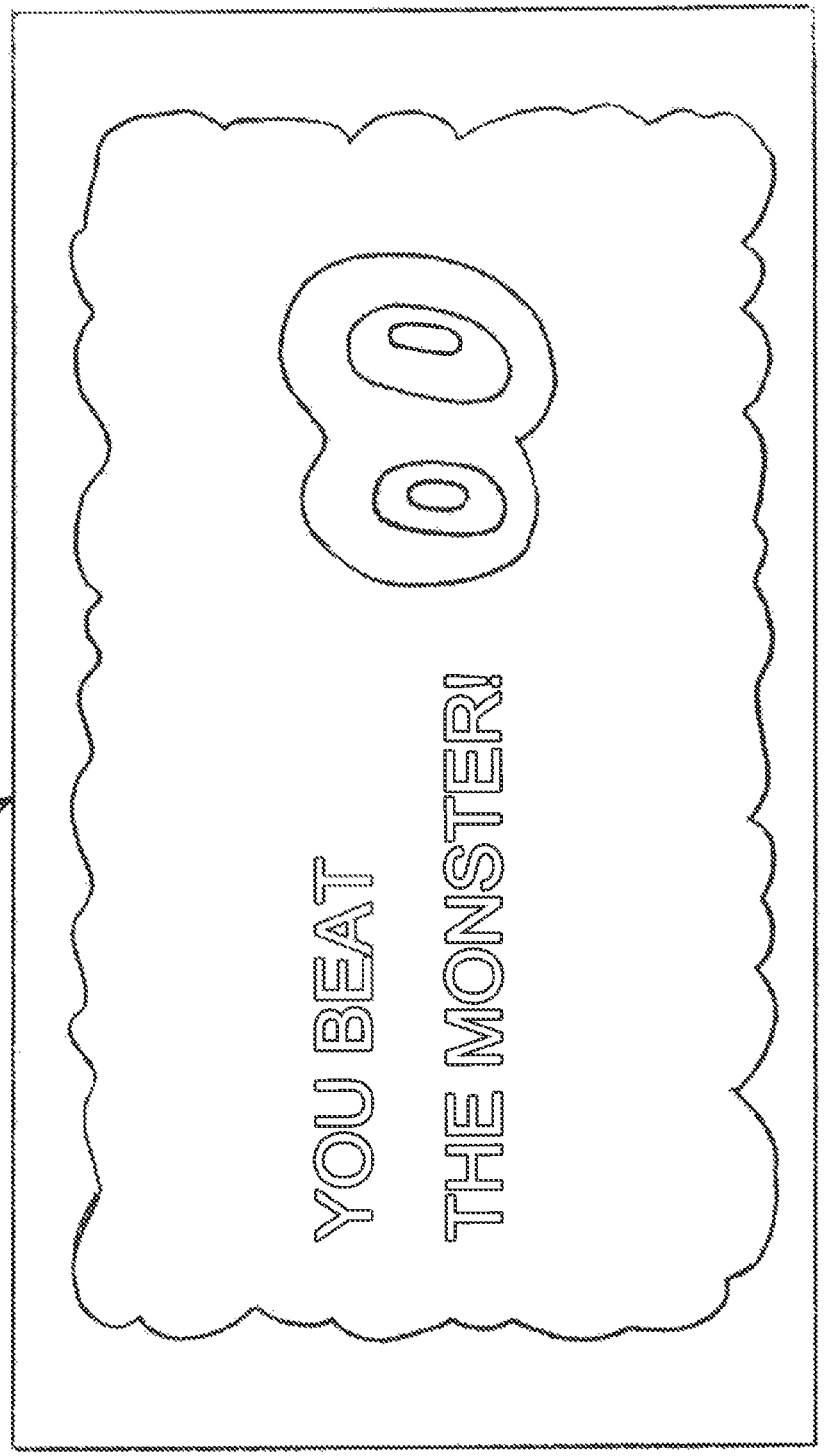

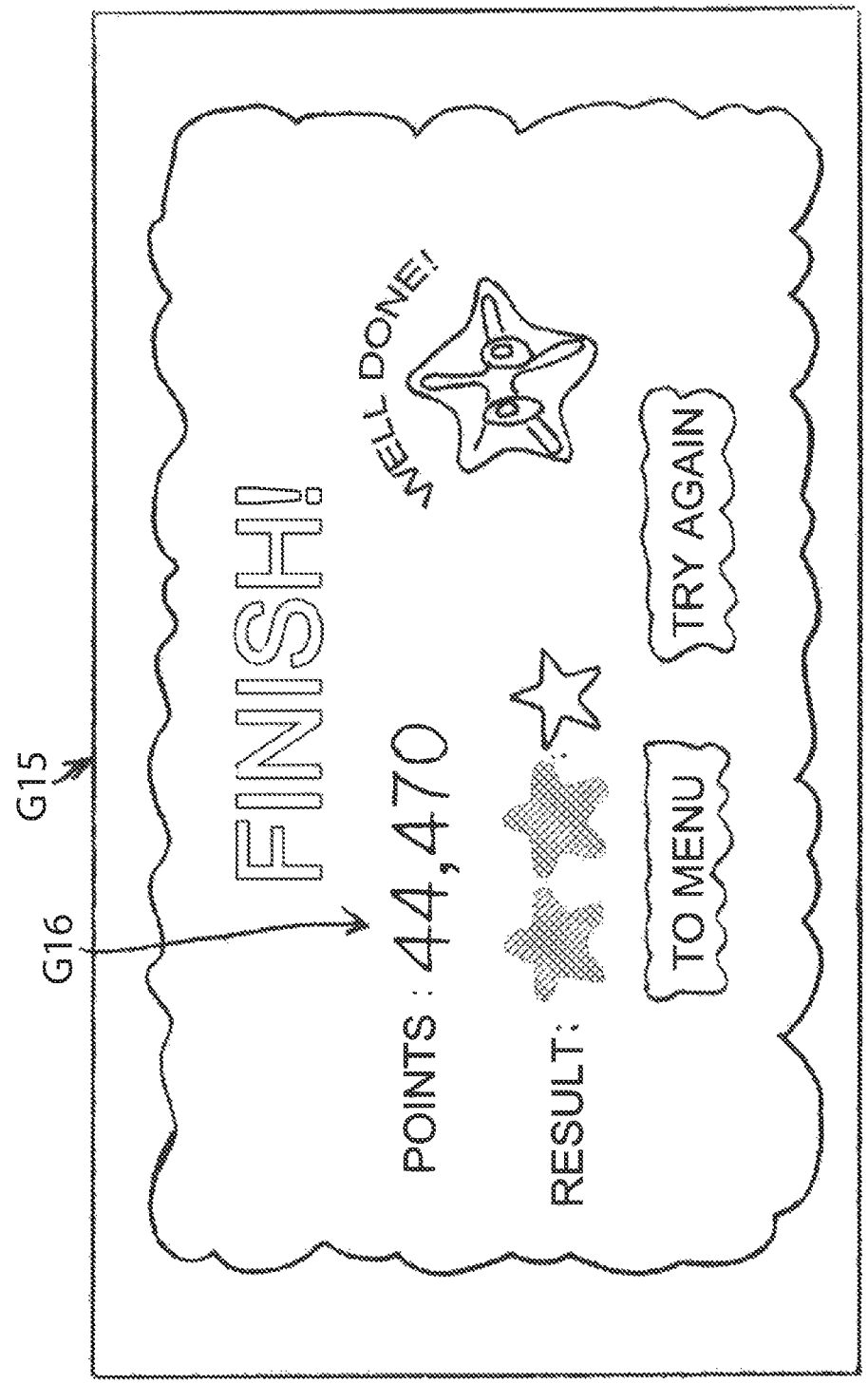

TOOTHBRUSH MODULE, ATTACHMENT FOR TOOTHBRUSH, BRUSHING ASSISTANCE SYSTEM, BRUSHING EVALUATION SYSTEM, BRUSHING ASSISTANCE DEVICE, AND BRUSHING ASSISTANCE PROGRAM

TECHNICAL FIELD

The present invention relates to a toothbrush module, a toothbrush attachment, a brushing assistance system, a brushing evaluation system, a brushing assistance device, and a brushing assistance program for use in brushing by a user.

BACKGROUND ART

A typical known electric toothbrush can determine whether brushing by a user is appropriate or not based on a detection result of a brushing position, a brushing time, or the number of brushings obtained by units provided in the toothbrush (see, for example, Patent Document 1). This electric toothbrush enables the user to learn how to perform brushing appropriately from a determination result of brushing.

CITATION LIST

Patent Literature

Patent Document 1: JP 4543663 B

SUMMARY OF INVENTION

Issues the Invention is to Address

In the electric toothbrush described in Patent Document 1, information on brushing is announced with an output device such as a liquid crystal display unit or a light-emitting diode (LED) provided in a housing for the electric toothbrush. However, during brushing, the electric toothbrush housing becomes situated into a position where it is unlikely to enter the field of view, and consequently the user has difficulty in seeing the information.

It is therefore an object of the present invention to provide a toothbrush module, a toothbrush attachment, a brushing assistance system, a brushing evaluation system, a brushing assistance device, and a brushing assistance program that make it easy for a user to know information on a brushing action during brushing.

Means for Resolving the Issues

A toothbrush module according to the present invention includes: a sensor unit that detects a predetermined physical quantity concerning a toothbrush; and a wireless transmission unit that transmits a radio signal indicating the physical quantity detected by the sensor unit.

With this configuration, a radio signal indicating the physical quantity detected by the sensor unit can be transmitted to the outside. Thus, even during brushing, a radio signal can be received at a location away from the hand and, based on the radio signal, information on a brushing action of a user can be announced. As a result, the user can easily obtain the information on the brushing action of the user during brushing.

The toothbrush attachment according to the present invention includes: the toothbrush module described above; a sensor unit that detects a predetermined physical quantity; a wireless transmission unit that transmits a radio signal indicating the physical quantity detected by the sensor unit; a housing unit that houses the sensor unit and the wireless transmission unit; and a coupling mechanism that removably attaches the housing unit to the toothbrush.

With this configuration, the toothbrush attachment can be attached to a manual toothbrush by using the coupling mechanism. Once the toothbrush attachment is attached to the toothbrush, the toothbrush and the housing unit of the toothbrush attachment integrally move. Accordingly, when the user performs brushing with the toothbrush, movement of this brushing action propagates to the sensor unit housed in the housing unit. Thus, the sensor unit can obtain information on the brushing action of the user. Since the thus-obtained information on the brushing action of the user can be transmitted to the outside with the wireless transmission unit, even in a case where the user uses a manual toothbrush, information on the brushing action of the user can be obtained at the outside.

Preferably, the toothbrush includes a substantially rod-like handle and a head, the head being disposed at a first end of the handle and implanted with bristle tufts; and the coupling mechanism couples a second end of the handle to the housing unit.

With this configuration, since the toothbrush attachment is attached to the second end of the toothbrush opposite to the head, the toothbrush attachment less disturbs brushing with the toothbrush to which the toothbrush attachment is attached.

Preferably, the sensor unit includes an acceleration sensor that detects acceleration as the physical quantity.

With the acceleration sensor, information on movement of the toothbrush in brushing by the user can be obtained from an acceleration, and thus, the acceleration sensor can be suitably used as the sensor unit.

Preferably, an instruction reception unit that receives a pressing force as a start instruction for starting an operation of the toothbrush module is disposed on an outer wall surface of the housing unit; and the coupling mechanism elastically holds the toothbrush with the second end of the handle facing the instruction reception unit.

With this configuration, since the toothbrush is elastically held directed toward the instruction reception unit, when the user pushes in the handle with the toothbrush directed toward the instruction reception unit, the pressure force can be applied as a start instruction to the instruction reception unit. In this manner, an operation of the toothbrush module can be started with a simple operation.

Preferably, the coupling mechanism is constituted by an elastomer; and the elastomer constitutes a recess that receives the housing unit therein, and a holding unit that is capable of receiving the second end of the handle and elastically holds the received handle with an elastic force of the elastomer.

With this configuration, since the elastomer is an elastic member, the toothbrush can be easily elastically held with the second end of the handle facing the instruction reception unit.

Preferably, the housing unit has a substantially flat bottom surface, an upper surface opposite to the bottom surface, and a side surface connecting the bottom surface and the upper surface to each other; the recess is formed to receive the housing unit so that the housing unit covers the upper surface and the side surface and is held with the elastic force of the elastomer; the instruction reception unit is disposed on the upper surface; and the holding unit holds the handle at the upper surface of the housing unit received by the recess so that an axial direction of the handle is substantially perpendicular to the bottom surface.

With this configuration, since the handle is held with the axial direction of the handle being substantially perpendicular to the bottom surface, when the toothbrush is placed on a flat place with the bottom surface facing down, the toothbrush can stand by itself. When the user presses the toothbrush in this state downward, the pressure force can be applied as a start instruction to the instruction reception unit. In this manner, an operation of the toothbrush module can be started with a simple operation.

Preferably, the holding unit has an insertion hole whose depth direction extends along an axial direction of the handle so that the insertion hole receives the second end of the handle; and the insertion hole has a bottom having a bottom part covering the insertion hole.

With this configuration, since the bottom of the insertion hole into which the handle of the toothbrush is inserted is closed, water running along the toothbrush is less likely to splash on the housing unit.

A brushing assistance system according to the present invention includes: the toothbrush attachment described above; and a wireless terminal device that receives the radio signal; wherein the wireless terminal device includes a wireless receiver that receives the radio signal and obtains the physical quantity, and an output unit that outputs an image or sound so as to support brushing by a user with the toothbrush based on the physical quantity.

With this configuration, the wireless terminal device can obtain information on a brushing action of the user from a radio signal transmitted from the toothbrush attachment. As a result, based on the physical quantity thereof, the wireless terminal device can output an image or sound to support brushing by the user with the toothbrush.

Preferably, the output unit includes a sound output unit that outputs sound based on the physical quantity.

With this configuration, the user can cause the sound output unit to output sound based on the manner of movement of the toothbrush to which the toothbrush attachment is attached. When the user performs brushing while listening to the sound, the brushing can be assisted by the sound. In addition, the brushing by the user who is listening to the sound can enhance enjoyment in the brushing.

Preferably, the wireless terminal device further includes a brushing manner evaluation unit that evaluates the brushing based on the physical quantity; the sound output unit includes a music information storage unit that stores music information representing music, and a music output unit that outputs music based on the music information stored in the music information storage unit; and the music output unit changes an output mode of the music based on an evaluation result obtained by the brushing manner evaluation unit.

With this configuration, the brushing manner evaluation unit evaluates brushing by the user based on the physical quantity. In addition, the music output unit outputs music, and an output mode of the music is changed based on an evaluation result of brushing. In this manner, the user can know whether brushing by the user is good or not while listening to the music, and thus, the quality of brushing can be easily enhanced with fun.

Preferably, the wireless terminal device further includes a cleaning effect evaluation unit that cumulatively evaluates a cleaning effect by brushing by the user based on the physical quantity, a display unit that displays an image on a predetermined display screen; and the output section includes a figure display control unit that displays a predetermined figure on the display screen if a cleaning evaluation result obtained by the cleaning effect evaluation unit is less than a predetermined reference cleaning level, and that erases the figure if the cleaning evaluation result exceeds the reference cleaning level.

With this configuration, if a cleaning evaluation result obtained by the cleaning effect evaluation unit is less than a predetermined reference cleaning level, that is, if teeth are considered to be insufficiently brushed, a predetermined figure is displayed on the display screen. If the cleaning evaluation result exceeds the reference cleaning level, that is, the teeth are considered to be appropriately brushed, the figure is erased. In this manner, the figure is erased by appropriate brushing by the user, and thus, the user can perform brushing while feeling as if the user plays a game of beating figures by brushing. Accordingly, brushing is assisted by the game, and enjoyment of the brushing is enhanced. The user can enhance the quality of brushing with fun. As a result, brushing can be easily made habitual.

Preferably, the wireless terminal device further includes a brushing position determination unit that determines one or more brushing positions on one or more teeth of the user with the toothbrush based on the physical quantity; the cleaning effect evaluation unit cumulatively evaluates the cleaning effect for each of the brushing positions determined by the brushing position determination unit; and the figure display control unit divides the display screen into a plurality of areas associated with the brushing positions, displays a predetermined figure in one of the areas corresponding to one of the brushing positions at which the cleaning evaluation result obtained by the cleaning effect evaluation unit is less than the reference cleaning level, and erases the figure displayed on one of the areas corresponding to one of the brushing positions at which the cleaning evaluation result exceeds the reference cleaning level.

With this configuration, for each brushing position, a figure is displayed at a position on the display screen corresponding to the brushing position in accordance with the degree of cleaning at the position. Thus, the user can erase a figure by brushing at a brushing position associated with the display position of the figure with a sense of a game. This enables a user to perform appropriate brushing with fun. As a result, brushing can be easily made habitual.

Preferably, the wireless terminal device further includes a brushing start determination unit that determines whether brushing by a user is started or not based on the physical quantity, and a timer unit that starts counting an elapsed time until a determination time previously set as a preferable brushing time has elapsed, when the brushing start determination unit determines that the brushing is started; and the output unit includes a notification unit that announces predetermined information from when the brushing start determination unit determines that the brushing is started until when the elapsed time reaches the determination time.

With this configuration, predetermined information is announced for a period from when brushing is started until when a determination time previously set as an appropriate brushing time has elapsed. As a result, the user can obtain information during brushing and effectively use the time. Thus, brushing can be easily made habitual. In addition, brushing is continued in a period in which the information is announced so that the brushing time becomes appropriate. In this manner, brushing is assisted, and the quality of brushing can be enhanced.

A brushing evaluation system according to the present invention includes: the toothbrush attachment described above; and a wireless terminal device that receives the radio signal; wherein the wireless terminal device includes a wireless receiver that receives the radio signal and obtains the physical quantity, and an evaluation unit that evaluates the brushing based on the physical quantity.

With this configuration, the wireless terminal device can obtain information on a brushing action of the user from a radio signal transmitted from the toothbrush attachment. As a result, brushing by the user with the toothbrush can be evaluated based on the physical quantity.

A brushing assistance system according to the present invention includes: the toothbrush module described above; and a wireless terminal device that receives the radio signal; wherein the wireless terminal device includes a wireless receiver that receives the radio signal and obtains the physical quantity, and an output unit that outputs an image or sound in a mode of enhancing enjoyment of a user based on the physical quantity.

With this configuration, the wireless terminal device can obtain information on a brushing action of the user from a radio signal transmitted from the toothbrush attachment. The output unit outputs an image or sound in a mode of enhancing enjoyment of the user in association with a brushing action of the user with the toothbrush. As a result, enjoyment in brushing by the user can be enhanced.

Preferably, the output unit includes a sound output unit that outputs sound based on the physical quantity.

With this configuration, the user can cause the sound output unit to output sound based on the manner of movement of the toothbrush to which the toothbrush attachment is attached. The user can perform brushing while listening to the sound so that enjoyment in brushing can be enhanced. In addition, the sound the user listened to can assist brushing.

Preferably, the wireless terminal device further includes a brushing manner evaluation unit that evaluates the brushing based on the physical quantity; the sound output unit includes a music information storage unit that stores music information representing music, and a music output unit that outputs music based on the music information stored in the music information storage unit; and the music output unit changes an output mode of the music based on an evaluation result obtained by the brushing manner evaluation unit.

With this configuration, the brushing manner evaluation unit evaluates brushing by the user based on the physical quantity. In addition, the music output unit outputs music, and an output mode of the music is changed based on an evaluation result of brushing. In this manner, the user can know whether brushing by the user is good or not while listening to the music, and thus, the quality of brushing can be easily enhanced with fun.

Preferably, the wireless terminal device further includes a cleaning effect evaluation unit that cumulatively evaluates a cleaning effect by brushing by the user based on the physical quantity, and a display unit that displays an image on a predetermined display screen; and the output section includes a figure display control unit that displays a predetermined figure on the display screen if a cleaning evaluation result obtained by the cleaning effect evaluation unit is less than a predetermined reference cleaning level, and that erases the figure if the cleaning evaluation result exceeds the reference cleaning level.

With this configuration, if a cleaning evaluation result obtained by the cleaning effect evaluation unit is less than a predetermined reference cleaning level, that is, if teeth are considered to be insufficiently brushed, a predetermined figure is displayed on the display screen. If the cleaning evaluation result exceeds the reference cleaning level, that is, the teeth are considered to be appropriately brushed, the figure is erased. In this manner, the figure is erased by appropriate brushing by the user, and thus, the user can perform brushing while feeling as if the user plays a game of beating figures by brushing. Accordingly, brushing is assisted by the game, and enjoyment in the brushing is enhanced. The user can enhance the quality of brushing with fun. As a result, brushing can be easily made habitual.

Preferably, the wireless terminal device further includes a brushing position determination unit that determines one or more brushing positions on one or more teeth of the user with the toothbrush based on the physical quantity; the cleaning effect evaluation unit cumulatively evaluates the cleaning effect for each of the brushing positions determined by the brushing position determination unit; and the figure display control unit divides the display screen into a plurality of areas associated with the brushing positions, displays a predetermined figure in one of the areas corresponding to one of the brushing positions at which the cleaning evaluation result by the cleaning effect evaluation unit is less than the reference cleaning level, and erases the figure displayed on one of the areas corresponding to one of the brushing positions at which the cleaning evaluation result exceeds the reference cleaning level.

With this configuration, for each brushing position, a figure is displayed at a position on the display screen corresponding to the brushing position in accordance with the degree of cleaning at the position. Thus, the user can erase a figure by brushing at a brushing position associated with the display position of the figure with a sense of a game. This enables a user to perform appropriate brushing with fun. As a result, brushing can be easily made habitual.

Preferably, the wireless terminal device further includes a brushing start determination unit that determines whether brushing by a user is started or not based on the physical quantity, a timer unit that starts counting an elapsed time until a determination time previously set as a preferable brushing time has elapsed, when the brushing start determination unit determines that the brushing is started; and the output unit includes a notification unit that announces predetermined information from when the brushing start determination unit determines that the brushing is started until when the elapsed time reaches the determination time.

With this configuration, predetermined information is announced for a period from when brushing is started until when a determination time previously set as an appropriate brushing time has elapsed. As a result, the user can obtain information during brushing and effectively use the time. Thus, brushing can be easily made habitual. In addition, brushing is continued in a period in which the information is announced so that the brushing time becomes appropriate. In this manner, brushing is assisted, and the quality of brushing can be enhanced.

Preferably, the wireless terminal device further includes a brushing manner evaluation unit that evaluates the brushing based on the physical quantity; the physical quantity includes an acceleration applied to the toothbrush; and the brushing manner evaluation unit evaluates the brushing based on a travel distance in one way of back-and-forth movement of the toothbrush.

In the Bass method, it is considered to be preferable that the toothbrush is moved back and forth in tiny strokes within a range corresponding to one tooth or less. In view of this, the brushing manner evaluation unit evaluates brushing based on a one-way stroke in the back-and-forth movement of the toothbrush, that is, the travel distance over the stroke width, to thereby enable appropriate evaluation of the brushing action of the user.

Preferably, the wireless terminal device further includes a brushing manner evaluation unit that evaluates the brushing based on the physical quantity; and the brushing manner evaluation unit evaluates the brushing based on a cycle of back-and-forth movement of the toothbrush and a travel speed in back-and-forth movement of the toothbrush.

With this configuration, brushing can be evaluated in consideration of the speed of repetitive back-and-forth movement of brushing and the brushing speed so that a brushing action can be more appropriately evaluated.

A brushing assistance device according to the present invention includes: a wireless receiver that receives a radio signal indicating a predetermined physical quantity concerning a toothbrush and obtains the physical quantity; and a sound output unit that outputs sound based on the physical quantity.

A brushing assistance program according to the present invention causes a computer to function as: a wireless receiving means that receives a radio signal indicating a predetermined physical quantity concerning a toothbrush and obtains the physical quantity; and a sound output means that outputs sound based on the physical quantity.

With these configurations, a user can output sound based on the manner of toothbrush movement to which the toothbrush attachment is attached. The user can perform brushing while listening to the sound so that enjoyment in brushing can be enhanced. In addition, the sound the user listened to can assist brushing.

Preferably, the brushing assistance device further includes: a brushing manner evaluation means that evaluates the brushing based on the physical quantity; wherein the sound output means includes a music information storage unit that stores music information representing music, and a music output unit that outputs music based on the music information stored in the music information storage means; and the music output means changes an output mode of the music based on an evaluation result obtained by the brushing manner evaluation means.

Preferably, the brushing assistance program also causes the computer to function as: a brushing manner evaluation unit that evaluates the brushing based on the physical quantity; wherein the sound output unit includes a music information storage means that stores music information representing music, and a music output means that outputs music based on the music information stored in the music information storage unit; and the music output unit changes an output mode of the music based on an evaluation result obtained by the brushing manner evaluation unit.

With these configurations, brushing by the user can be evaluated based on the physical quantity, music is output, and an output mode of the music is changed based on the evaluation result of brushing. In this manner, the user can know whether brushing by the user is good or not while listening to the music, and thus, the quality of brushing can be easily enhanced with fun.

A brushing assistance device according to the present invention includes: a wireless receiver that receives a radio signal indicating a predetermined physical quantity concerning a toothbrush and obtains the physical quantity; a cleaning effect evaluation unit that cumulatively evaluates a cleaning effect by brushing by a user based on the physical quantity; a display unit that displays an image on a predetermined display screen; and a figure display control unit that displays a predetermined figure on the display screen if a cleaning evaluation result obtained by the cleaning effect evaluation unit is less than a predetermined reference cleaning level, and that erases the figure if the cleaning evaluation result exceeds the reference cleaning level.

A brushing assistance program according to the present invention causes a computer to function as: a wireless receiving means that receives a radio signal indicating a predetermined physical quantity concerning a toothbrush and obtains the physical quantity; a cleaning effect evaluation means that cumulatively evaluates a cleaning effect by brushing by a user based on the physical quantity; a display means that displays an image on a predetermined display screen; and a figure display control means that displays a predetermined figure on the display screen if a cleaning evaluation result obtained by the cleaning effect evaluation means is less than a predetermined reference cleaning level, and that erases the figure if the cleaning evaluation result exceeds the reference cleaning level.

With these configurations, for each brushing position, a figure is displayed at a position on the display screen corresponding to the brushing position in accordance with the degree of cleaning at the position. Thus, the user can erase a figure by brushing at a brushing position associated with the display position of the figure with a sense of a game. This enables a user to perform appropriate brushing with fun. As a result, brushing can be easily made habitual.

A brushing assistance device according to the present invention includes: a wireless receiver that receives a radio signal indicating a predetermined physical quantity concerning a toothbrush and obtains the physical quantity; a brushing start determination unit that determines whether brushing by a user is started or not based on the physical quantity; a timer unit that starts counting an elapsed time until a determination time previously set as a preferable brushing time has elapsed, when the brushing start determination unit determines that the brushing is started; and a notification unit that announces predetermined information from when the brushing start determination unit determines that the brushing is started until when the elapsed time reaches the determination time.

A brushing assistance program according to the present invention causes a computer to function as: a wireless receiving means that receives a radio signal indicating a predetermined physical quantity concerning a toothbrush and obtains the physical quantity; a brushing start determination means that determines whether brushing by a user is started or not based on the physical quantity; a timer means that starts counting an elapsed time until a determination time previously set as a preferable brushing time has elapsed when the brushing start determination means determines that the brushing is started; and a notification means that announces predetermined information from when the brushing start determination means determines that the brushing is started until when the elapsed time reaches the determination time.

With this configuration, predetermined information is announced for a period from when brushing is started until when a determination time previously set as an appropriate brushing time has elapsed. As a result, the user can obtain information during brushing and effectively use the time. Thus, brushing can be easily made habitual. In addition, brushing is continued in a period in which the information is announced so that the brushing time becomes appropriate. In this manner, brushing is assisted, and the quality of brushing can be enhanced.

Advantageous Effects of the Invention

With a brush module, a toothbrush attachment, a brushing assistance system, a brushing evaluation system, a brushing assistance device, and a brushing assistance program having configurations described above, a user can obtain information on a brushing action of the user even during brushing.

BRIEF DESCRIPTION OF THE DRAWINGS

FIG. 11A, FIG. 11B and FIG. 11C show screen views illustrating examples of display screens displayed on a touch panel display by a music playing unit illustrated in FIG. 10.

FIG. 31 is a screen of line drawing corresponding to FIG. 15.

FIG. 32 is a screen of line drawing corresponding to FIG. 16.

FIG. 33 is a screen of line drawing corresponding to FIG. 17.

FIG. 34 is a screen of line drawing corresponding to FIG. 18.

DETAILED DESCRIPTION OF THE INVENTION

In recent situations, although electric toothbrushes are being widespread, the number of users using manual toothbrushes is still larger than that of those not using electric toothbrushes in actuality. In the technique described in Patent Document 1, however, it is not easy to obtain information on a brushing action from a manual toothbrush. Thus, there is inconvenience in which a user performing brushing with a manual toothbrush cannot obtain information on this brushing action.

For this reason, it is preferable to provide a toothbrush attachment, a brushing assistance system, and a brushing evaluation system that enable a use to obtain information on a brushing action by the user even in a case where the user uses a manual toothbrush.

There has been inconvenience to many users who feel complexity in performing brushing itself and do not enjoy the brushing.

In view of this, it is preferable to provide a brushing assistance system, a brushing assistance device, and a brushing assistance program that can enhance enjoyment in brushing.

Figure 1:
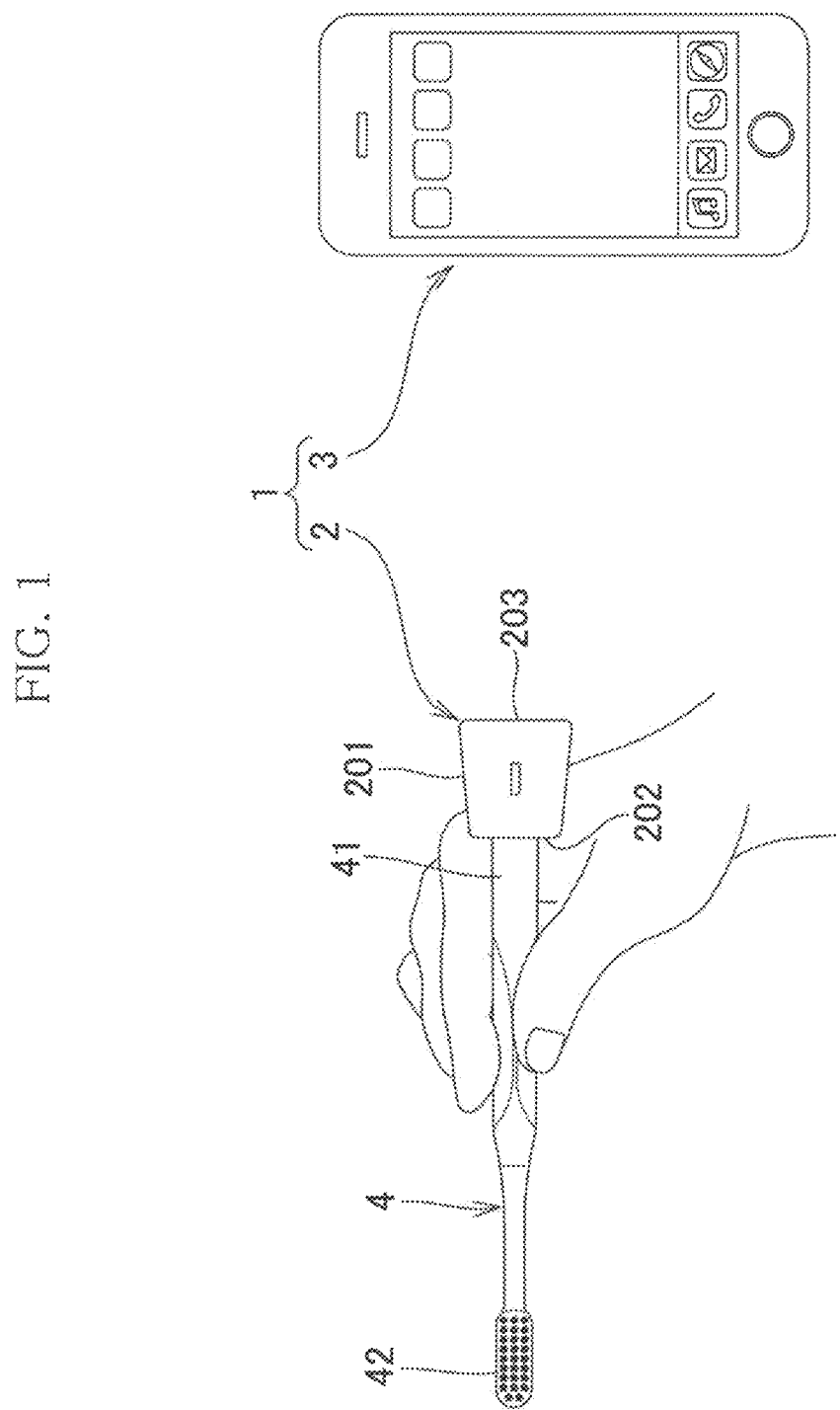
FIG. 1 is a conceptual view illustrating an example configuration of a brushing assistance system using a toothbrush attachment according to an embodiment of the present invention.

An embodiment of the present invention will be described with reference to the drawings. In the drawings, components having the same reference figures have the same configurations, and description thereof will not be repeated. FIG. 1 is a conceptual view illustrating an example configuration of a brushing assistance system using a toothbrush attachment according to an embodiment of the present invention.

A brushing assistance system 1 illustrated in FIG. 1 includes a toothbrush attachment 2 and a wireless terminal device 3. The wireless terminal device 3 is, for example, a portable wireless communication terminal device. The wireless terminal device 3 may be a terminal device having a wireless communication function, such as a so-called smart-phone or a tablet terminal, a wearable terminal device of, for example, a glass type or a wristband type, a portable personal computer, or a cellular phone terminal device. The wireless terminal device 3 is not limited to a portable terminal device, and may be a fixed wireless communication terminal device such as a desktop personal computer. The wireless terminal device 3 corresponds to an example of a brushing assistance device according to an embodiment of the present invention.

Figure 2:
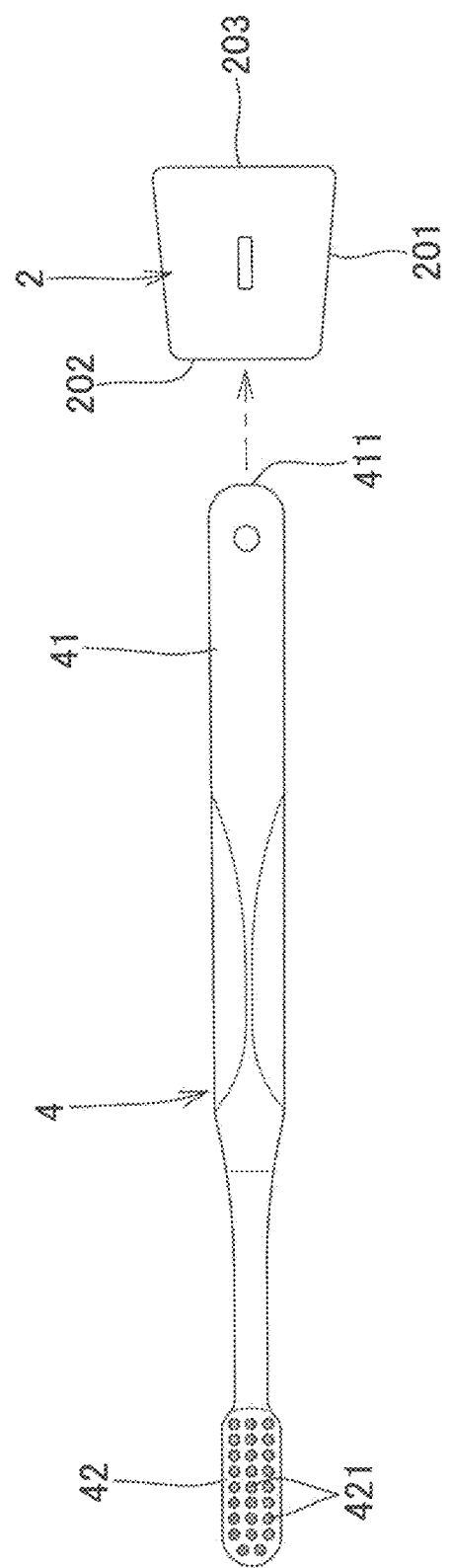
FIG. 2 is a plan view illustrating a state in which the toothbrush attachment illustrated in FIG. 1 is detached from a toothbrush.

The toothbrush attachment 2 is configured such that a waterproof housing 201 (housing unit) houses a sensor unit 21, a wireless transmission unit 22, and a circuit block 207 including an unillustrated battery and other elements. The circuit block 207 corresponds to an example of a toothbrush module. The housing 201 includes a coupling mechanism 202 for coupling the housing 201 to a toothbrush 4. As illustrated in FIG. 2, the toothbrush attachment 2 is configured to be removably attached to the toothbrush 4 with the coupling mechanism 202.

The toothbrush 4 includes a substantially rod-like handle 41 and a head 42 disposed at an end of the handle 41 and implanted with bristle tufts 421. The coupling mechanism 202 is configured to hold the other end 411 of the handle 41 opposite to the head 42. The coupling mechanism 202 holds the end 411 so that the toothbrush 4 and the toothbrush attachment 2 are coupled to each other, and the toothbrush attachment 2 is attached to the toothbrush 4. Once the toothbrush attachment 2 is attached to the toothbrush 4, the toothbrush attachment 2 moves integrally with the toothbrush 4 along with brushing by a user. The toothbrush 4 may be a replacement brush for an electric toothbrush, for example.

The toothbrush attachment 2 has a substantially flat bottom surface 203. The bottom surface 203 is approximately perpendicular to a longitudinal direction of the handle 41 with the toothbrush attachment 2 being attached to the toothbrush 4. Thus, by placing the toothbrush 4 in an upright position on, for example, a table with the bottom surface 203 facing the table, the toothbrush 4 to which the toothbrush attachment 2 is attached can stand. In this manner, the toothbrush attachment 2 can be used as a toothbrush stand.

Figure 3:
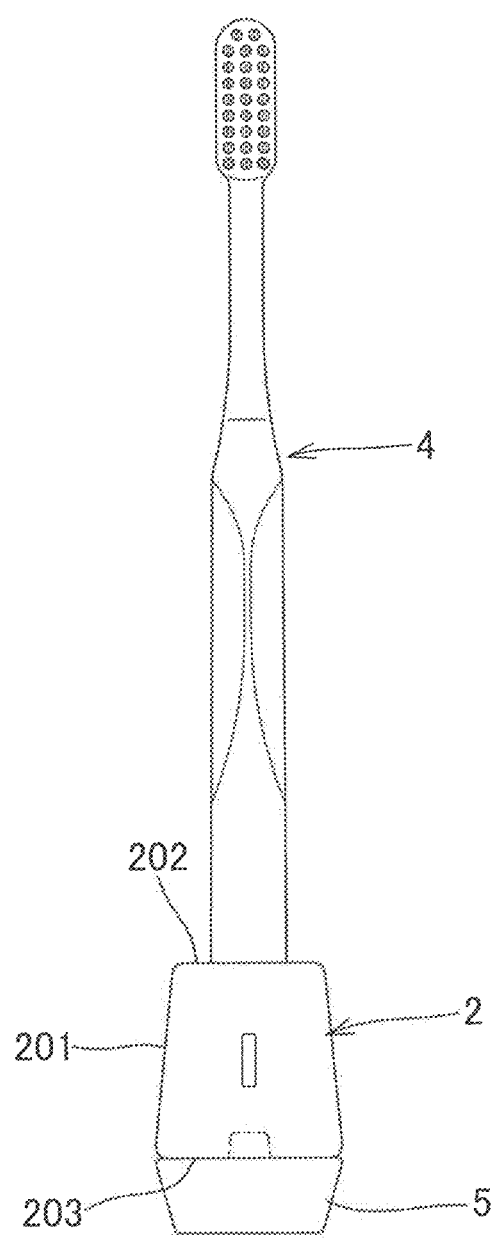
FIG. 3 is a plan view illustrating a state in which a charger is attached to the toothbrush attachment illustrated in FIG. 1 and used as a toothbrush stand.

An operating power supply of the toothbrush attachment 2 may be replaceable by using a small primary battery such as a button battery or chargeable by incorporating a secondary battery therein. In the case of using the secondary battery as an operating power supply of the toothbrush attachment 2, as illustrated in, for example, FIG. 3, a charger 5 may be made attachable to the bottom surface 203 so that the charger 5 can be charged in, for example, a non-contact manner with the toothbrush 4 being in the upright position.

Figure 4:
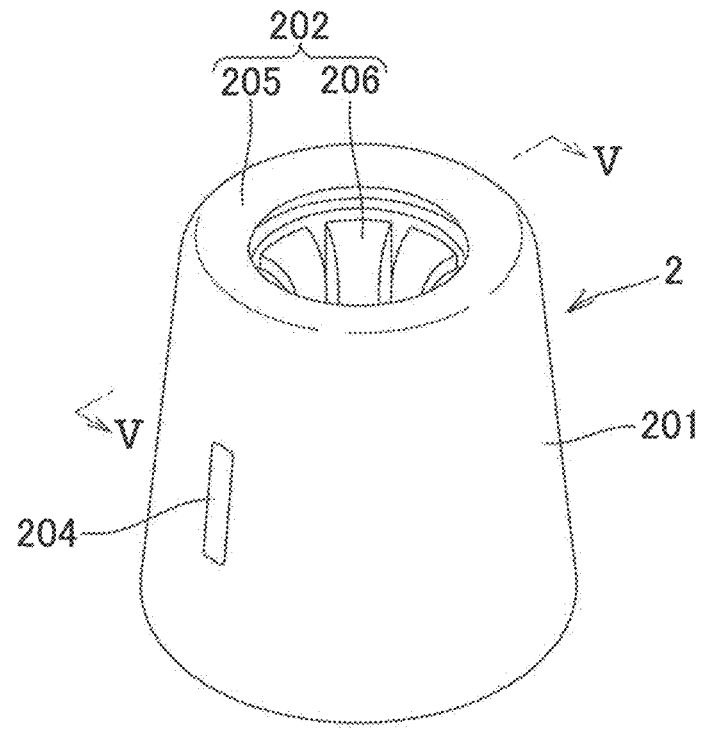
FIG. 4 is a perspective view of the toothbrush attachment illustrated in FIG. 1.
Figure 5:
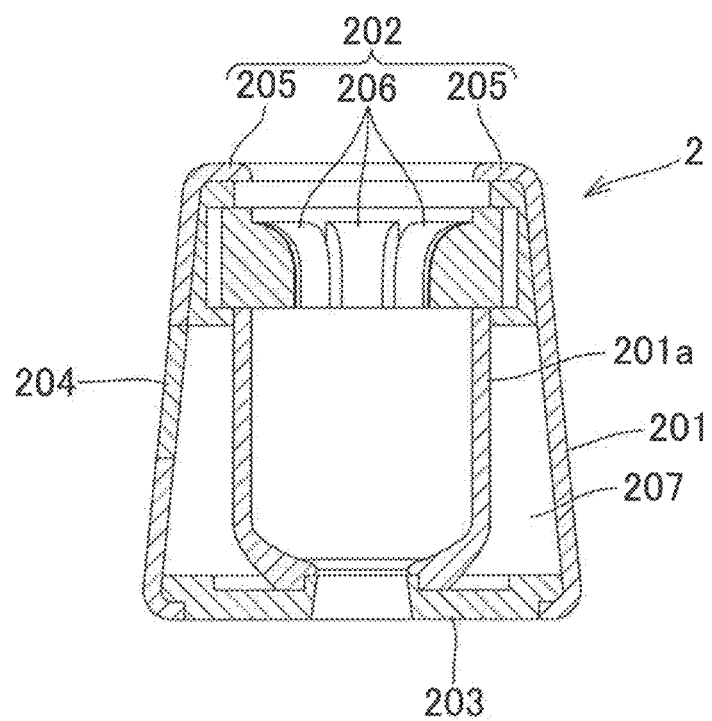
FIG. 5 is a cross-sectional view taken along line V-V in the toothbrush attachment illustrated in FIG. 4.

FIG. 4 is a perspective view of the toothbrush attachment 2 illustrated in FIG. 1. FIG. 5 is a cross-sectional view taken along line V-V of the toothbrush attachment 2 illustrated in FIG. 4. The housing 201 is made of, for example, a resin material and has an approximately cylindrical shape. A cylindrical part 201a having a cylindrical shape to receive the end 411 of the toothbrush 4 is disposed at substantially the center of the housing 201. The circuit block 207 is, for example, resin-molded and housed in a waterproof state in space between the cylindrical part 201a and the housing 201. A side surface of the housing 201 is provided with a light-emitting diode (LED) display unit 204 for indicating an operating state of the toothbrush attachment 2, for example. The bottom surface 203 includes a positioning hole or a recess, for example, to be engaged with a projection formed on the charger 5.

An outer peripheral portion of the housing 201 extends cylindrically to the direction opposite to the bottom surface 203, thereby constituting a cylindrical coupling frame 205. A plurality of, for example, eight, elastic members 206 are attached to an inner peripheral portion of the coupling frame 205. The elastic members 206 are constituted by an elastic elastomer, such as silicon rubber, natural rubber, or synthetic rubber. The coupling frame 205 and the elastic members 206 constitute the coupling mechanism 202. The end 411 of the handle 41 of the toothbrush 4 is inserted in space surrounded by the elastic members 206 so that the end 411 of the handle 41 is gripped by the elastic members 206, and the housing 201 and the handle 41 are coupled to each other. The toothbrush 4 is configured to be detached from the toothbrush attachment 2 by pulling the toothbrush 4 from the coupling mechanism 202 against a gripping force of the coupling mechanism 202. In this manner, the toothbrush attachment 2 can be removably attached to the toothbrush 4.

Figure 6:
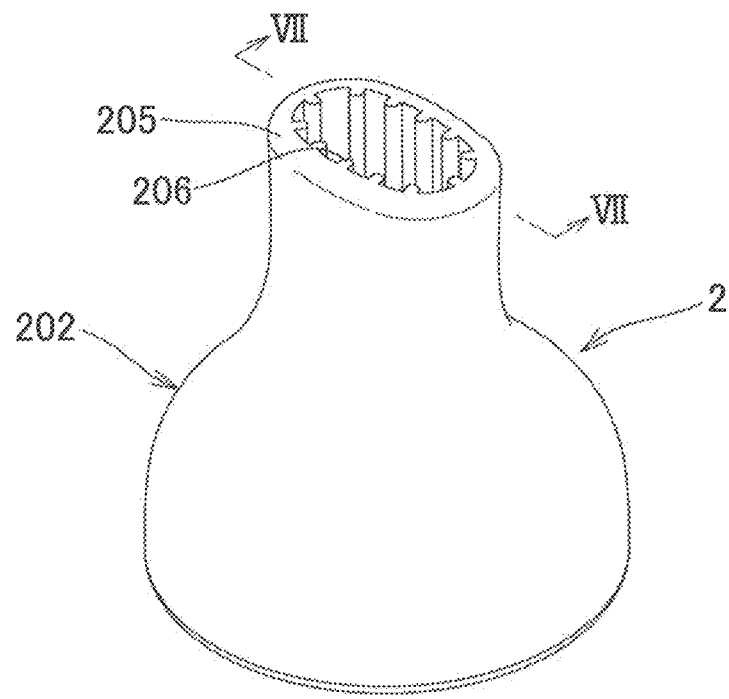
FIG. 6 is a perspective view of another example of the toothbrush attachment illustrated in FIG. 4.
Figure 7:
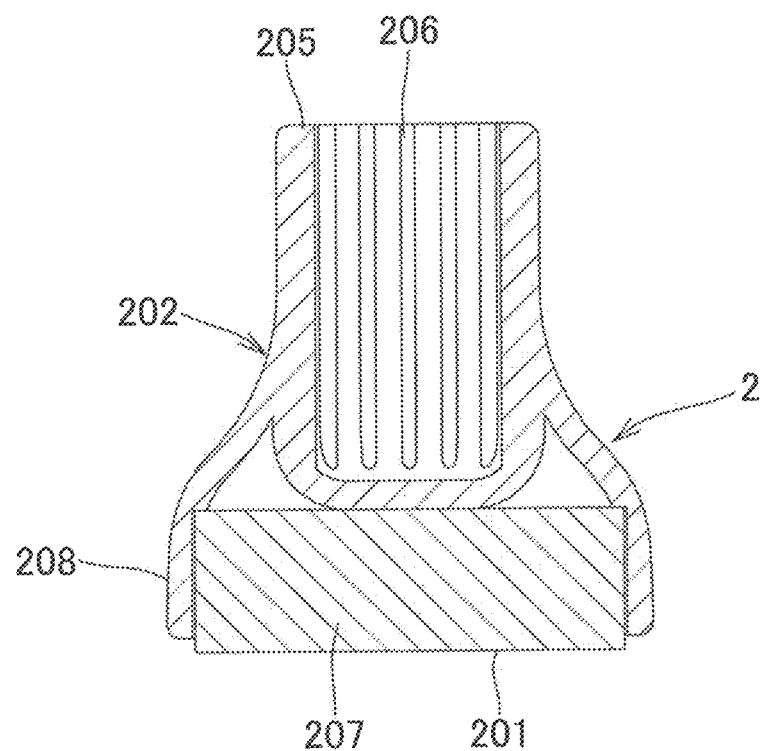
FIG. 7 is a cross-sectional view taken along line VII-VII in the toothbrush attachment illustrated in FIG. 6.
Figure 8:
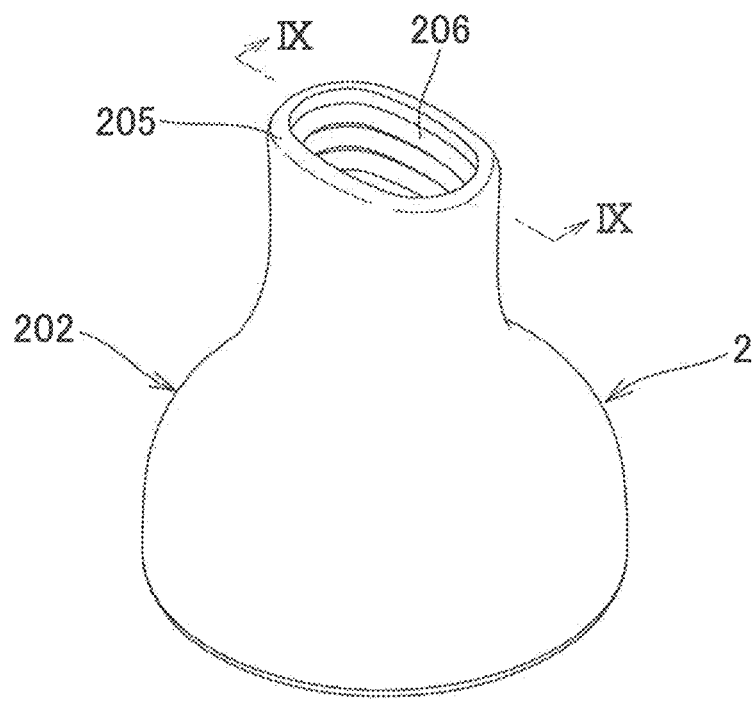
FIG. 8 is a perspective view of another example of the toothbrush attachment illustrated in FIG. 4.
Figure 9:
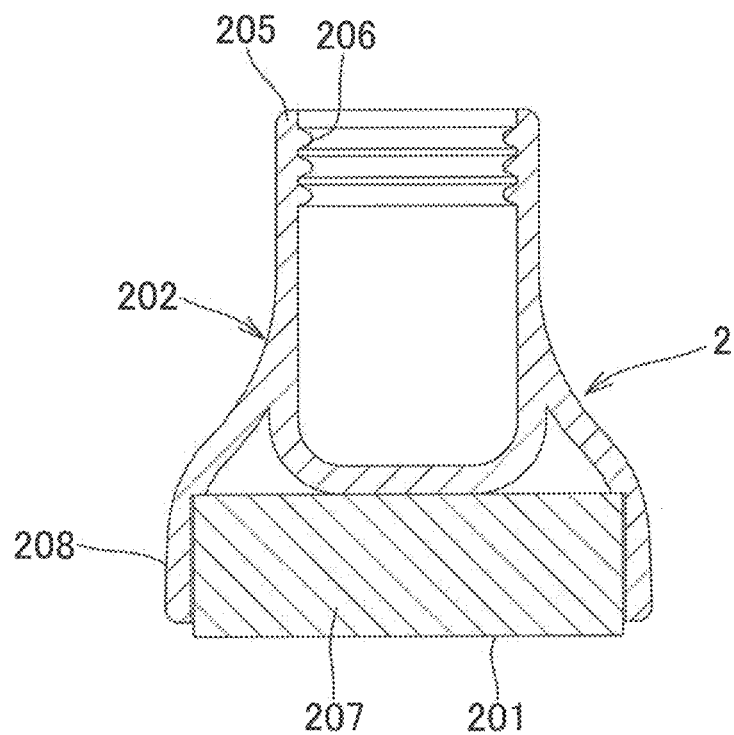
FIG. 9 is a cross-sectional view taken along line IX-IX in the toothbrush attachment illustrated in FIG. 8.

The toothbrush attachment 2 is not limited to the configuration illustrated in FIGS. 4 and 5. FIGS. 6 and 8 are perspective views illustrating other examples of the toothbrush attachment 2. FIG. 7 is a cross-sectional view taken along line VII-VII in the toothbrush attachment 2 illustrated in FIG. 6. FIG. 9 is a cross-sectional view taken along line IX-IX in the toothbrush attachment 2 illustrated in FIG. 8.

In the toothbrush attachment 2 illustrated in FIGS. 6 and 7, the coupling frame 205 has a flat cylindrical shape. A grip unit 208 having a flare shape is disposed at an end of the coupling frame 205 to surround the housing 201. The housing 201 illustrated in FIG. 7 has, for example, a substantially cylindrical shape and is closed at both ends with a bottom plate and a top lid. The grip unit 208 grips the housing 201 so that the coupling frame 205 is attached to the housing 201. The elastic members 206 are formed as ribs extending along the axial direction of the coupling frame 205. The coupling frame 205, the elastic members 206, and the grip unit 208 are integrally formed of an elastic elastomer, such as silicon rubber, natural rubber, or a synthetic rubber.

The toothbrush attachment 2 illustrated in FIGS. 8 and 9 is different from the toothbrush attachment 2 illustrated in FIGS. 6 and 7 in that the plurality of elastic members 206 are formed as ring-shaped ribs extending along the inner periphery of the coupling frame 205. The other part of the configuration of the toothbrush attachment 2 illustrated in FIGS. 8 and 9 is similar to that of the toothbrush attachment 2 illustrated in FIGS. 6 and 7, and thus, description thereof will not be repeated.

Figure 10:
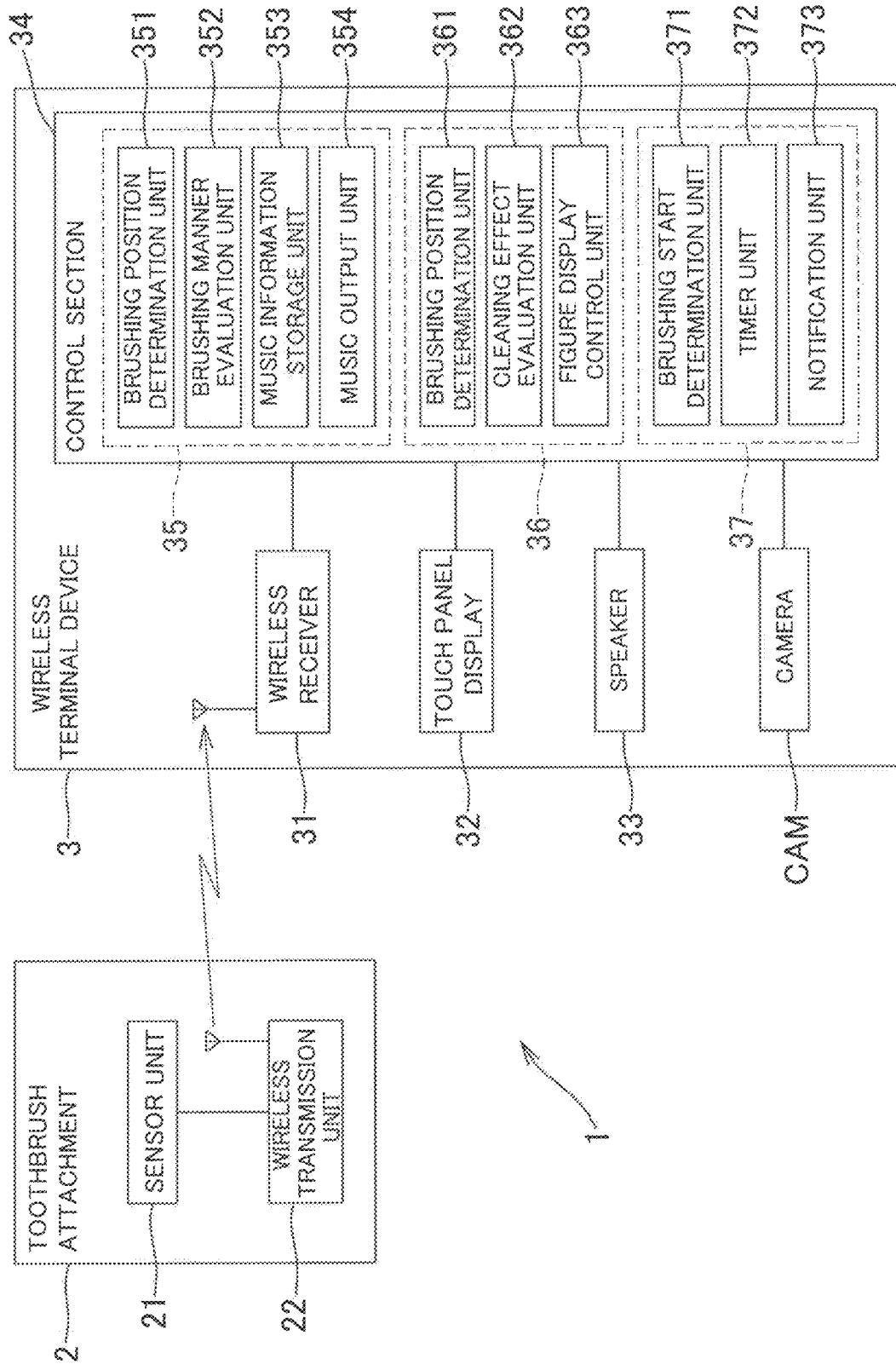
FIG. 10 is a block diagram illustrating an example electrical configuration of the brushing assistance system illustrated in FIG. 1.

FIG. 10 is a block diagram illustrating an example electrical configuration of the brushing assistance system 1 illustrated in FIG. 1. The toothbrush attachment 2 includes the sensor unit 21 and the wireless transmission unit 22. The sensor unit 21 detects a predetermined physical quantity concerning the toothbrush 4. Specifically, as the sensor unit 21, an acceleration sensor for detecting an acceleration can be used. The acceleration sensor may be preferably a three-axis acceleration sensor for detecting accelerations in three directions.

Since the toothbrush attachment 2 moves integrally with the toothbrush 4 while being attached to the toothbrush 4, the sensor unit 21 detects an acceleration caused by movement of the toothbrush 4 as a physical quantity concerning the toothbrush 4.

The sensor unit 21 detects a gravitational acceleration generated by the gravity of the earth. Since the toothbrush attachment 2 moves integrally with the toothbrush 4, the orientation of the toothbrush attachment 2 changes in accordance with a change in orientation of the toothbrush 4, and the direction of a gravitational acceleration detected by the sensor unit 21 changes accordingly. Thus, the orientation of the toothbrush 4 can be detected from the direction of the gravitational acceleration detected by the sensor unit 21. To simplify the description below, detection of the orientation of the toothbrush based on the direction of the gravitational acceleration detected by the sensor unit 21 will be hereinafter simply referred to as detection of the orientation of the toothbrush with the sensor unit 21.

The sensor unit 21 is not limited to an acceleration sensor. The sensor unit 21 may be a sensor such as a gyro sensor for detecting a rotation angle or an angular velocity of the toothbrush 4, a magnetic compass for detecting a geomagnetism, a global positioning system (GPS) for obtaining positional information, a pressure sensor for detecting a pressing force of the bristle tufts 421 against teeth of a user, a distance sensor for measuring a distance, or a sensor such as a microphone, or may include two or more of such sensors.

The configuration of the toothbrush attachment 2 described above enables the toothbrush attachment 2 to be attached to the manual toothbrush 4 by using the coupling mechanism 202. Once the toothbrush attachment 2 is attached to the toothbrush 4, the toothbrush 4 and the housing 201 of the toothbrush attachment 2 move integrally. Thus, when a user performs brushing with the toothbrush 4, movement of this brushing action propagates to the sensor unit 21 housed in the housing 201. Accordingly, the sensor unit 21 can obtain information on the brushing action of the user. The thus-obtained information on the brushing action of the user can be transmitted to the outside by the wireless transmission unit 22. As a result, even in a case where the user uses the manual toothbrush 4, information on the brushing action of the user can be obtained outside.

The wireless transmission unit 22 can employ various wireless communication methods including wireless communication circuits using electromagnetic waves, such as Bluetooth (registered trademark), WiFi (registered trademark), ZigBee, and near field communication (NFC), infrared communication, and visible light communication. The wireless transmission unit 22 transmits a radio signal indicating an acceleration (physical quantity) detected by the sensor unit 21.

The wireless terminal device 3 includes a wireless receiver 31, a touch panel display 32 (display unit), a speaker 33, a camera CAM (image pickup unit), and a control section 34. The wireless receiver 31 is a wireless communication circuit that receives a radio signal by the same wireless communication method as that used by the wireless transmission unit 22. The wireless receiver 31 receives a radio signal from the wireless transmission unit 22, obtains acceleration information indicating an acceleration detected by the sensor unit 21 from the radio signal, and outputs the obtained acceleration information to the control section 34.

The touch panel display 32 is constituted by a combination of, for example, a liquid crystal display device and a touch panel for detecting a position at which a user touched a display screen of the liquid crystal display device. The touch panel display 32 may be replaced by a display unit such as the liquid crystal display device and an operation input device such as a keyboard.

The speaker 33 outputs sound in accordance with a signal output from the control section 34. The camera CAM is a so-called in-camera for taking an image at the touch panel display 32 of the wireless terminal device 3, and captures an image near the face of a user seeing the touch panel display 32.

The control section 34 include, for example, a central processing unit (CPU) that executes a predetermined computation process, a random access memory (RAM) that temporarily stores data, a nonvolatile storage unit such as a flash memory or an electrically erasable programmable read-only memory (EEPROM), a timer circuit, and their peripheral circuits. The storage unit stores a brushing assistance program according to an embodiment of the present invention, programs such as a predetermined control program and an application program, data, and so forth. The brushing assistance program may be stored in a storage medium such as an optical disk or a semiconductor memory, or may be constructed as a storage medium storing a brushing assistance program.

The control section 34 functions as a music playing unit 35, a game unit 36, and a brushing timer unit 37 by, for example, executing the brushing assistance program described above. The music playing unit 35 mainly includes a brushing position determination unit 351 a brushing manner evaluation unit 352 (evaluation unit), a music output unit 354 (sound output unit, output unit), and a music information storage unit 353. The music information storage unit 353 is constituted by using the RAM or the storage unit described above. The game unit 36 mainly includes a brushing position determination unit 361, a cleaning effect evaluation unit 362 (evaluation unit), and a figure display control unit 363 (output unit). The brushing timer unit 37 mainly includes a brushing start determination unit 371, a timer unit 372, and a notification unit 373 (output unit). These programs may be configured to be downloaded through, for example, a communication network such as an unillustrated wireless telephone line or the Internet.

The touch panel display 32 displays, for example, unillustrated icons individually corresponding to the music playing unit 35, the game unit 36, and the brushing timer unit 37. When the icon corresponding to the music playing unit 35 is touched, the music playing unit 35 starts execution. When the icon corresponding to the game unit 36 is touched, the game unit 36 starts execution. When the icon corresponding to the brushing timer unit 37, the brushing timer unit 37 starts execution. The touch panel display 32 is also used as an input section for receiving a user operation such as a function selecting operation or selecting operation of each mode as described above.

First, the music playing unit 35 will be described. FIG. 11, FIG. 11B and FIG. 11C (FIG. 29A, FIG. 29B and FIG. 29C) show screen views of example display screens displayed on the touch panel display 32 by the music playing unit 35 illustrated in FIG. 10. The music playing unit 35 can generally perform a song mode and a free mode.

In the song mode, in accordance with acceleration information, the music playing unit 35 changes the output mode of music by appropriately playing music when brushing is performed well and by playing wrong notes or harmonies or disturbing the rhythm of music when brushing is not performed well.

In the free mode, the music playing unit 35 changes output sound in accordance with acceleration information obtained by the wireless receiver 31 so that a user can enjoy brushing by using the toothbrush 4 as a musical instrument as if the user plays music.

Figure 29:
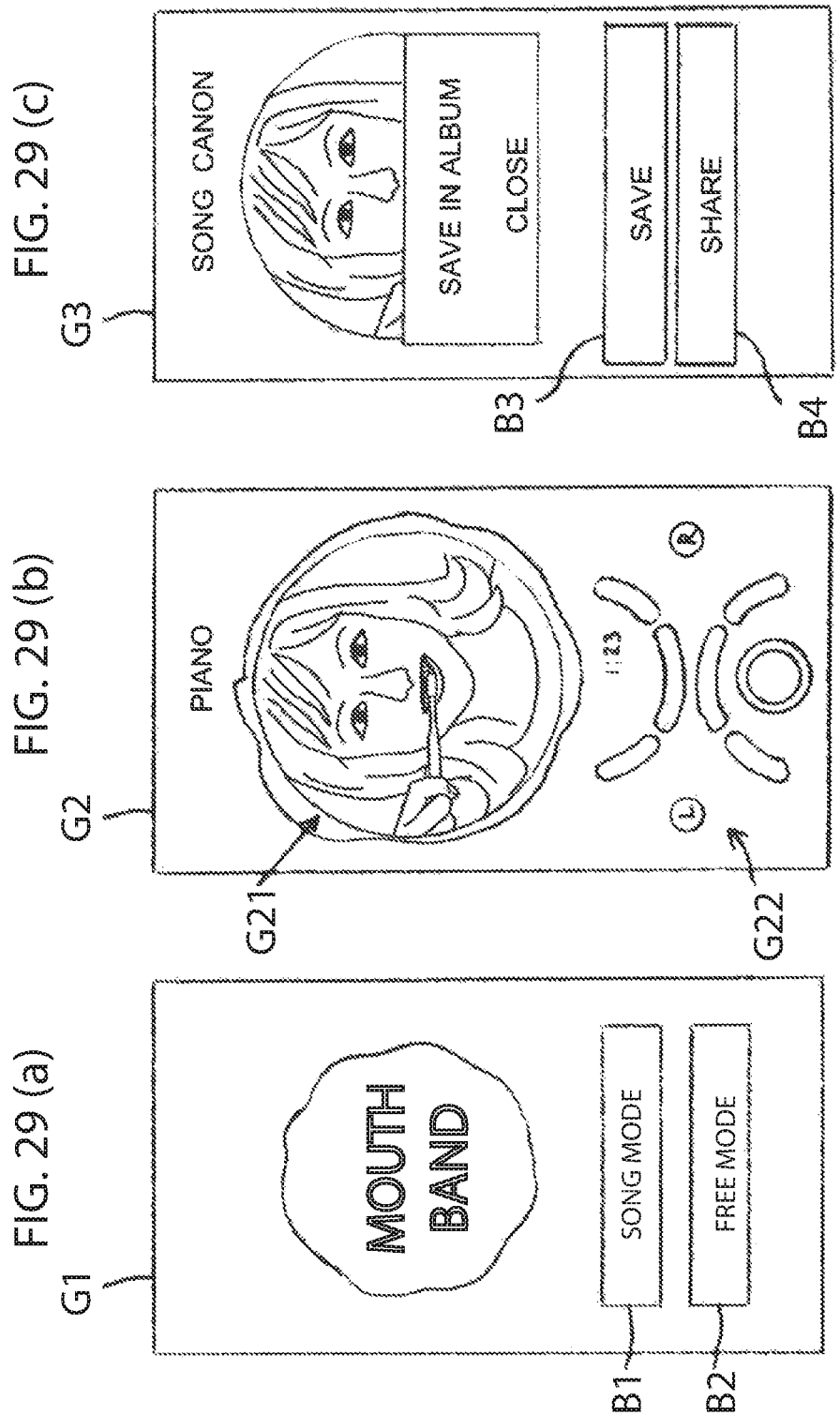
FIG. 29A, FIG. 29B and FIG. 29C show screens of line drawings corresponding to FIG. 11.

The song mode and the free mode can be selected with a performed selection screen G1 shown in FIG. 11(*a*) (FIG. 29(*a*)), for example. For example, the song mode is selected when the user performs a touch operation on a song mode button B1, whereas the free mode is selected when the user performs a touch operation on the free mode button B2.

Specifically, the brushing position determination unit 351 determines the brushing position on teeth of the user with the toothbrush 4 based on the acceleration information obtained by the wireless receiver 31. The brushing position is determined to be, for example, one of five positions: a lower right back tooth, a lower left back tooth, an upper right back tooth, an upper left back tooth, and upper and lower anterior teeth. The brushing position is not limited to the examples of the five positions described above. The brushing position determination unit 351 may determine the brushing position at one of four positions of a lower right back tooth, a lower left back tooth, an upper right back tooth, and an upper left back tooth, for example, or may more specifically determine the brushing position from six or more positions.

As a method for determining the brushing position by the brushing position determination unit 351, methods described in JP-T-2011-524756 (WO2009/141489), JP 4543663 B, JP 2009-240760 (US 2011010876), and JP 2011-139844 (US 2012266397) may be employed.

After the song mode or the free mode has been selected, the control section 34 causes the touch panel display 32 to display an in-brushing screen G2 shown in FIG. 11(b) (FIG. 29(b)). The in-brushing screen G2 displays a user image G21 that is a user image captured by the camera CAM and a brushing position display image G22 displaying a brushing position determined by the brushing position determination unit 351. The brushing position display image G22 indicates a brushing position by using a change of a color in a portion corresponding to the brushing position in an image schematically showing a tooth profile of a human, for example. When the song mode or the free mode is finished, an end screen G3 shown in FIG. 11(c) (FIG. 29(c)) is displayed on the touch panel display 32.

In the following description, the image may be any one of a still image or a moving image.

The brushing manner evaluation unit 352 evaluates the skill of brushing by a user based on the acceleration information obtained by the wireless receiver 31. As a brushing evaluation method, the number of strokes in back-and-forth movements in a unit time (brushing frequency), for example, is calculated from the acceleration information, and it is determined whether brushing is good or not based on whether the number of strokes in the back-and-forth movements is less than a predetermined appropriate number or not. Alternatively, it may be determined whether brushing is good or not based on whether the orientation of the toothbrush detected by the sensor unit 21 is a predetermined appropriate orientation or not.

The brushing manner evaluation unit 352 only needs to evaluate whether brushing by the user is good or not, and is not limited to a specific evaluation method. The brushing manner evaluation unit 352 is not limited to the example of evaluation based on the acceleration information, and may perform evaluation based on another physical quantity such as pressure or temperature.

As another example of evaluation, a reference physical quantity corresponding to an appropriate brushing action may be experimentally obtained and stored in the storage unit beforehand for each brushing position (cleaning site) so that the brushing manner evaluation unit 352 can refer to the storage unit to obtain the reference physical quantity corresponding to a current brushing position determined by the brushing position determination unit 351 and evaluate brushing based on the difference between the physical quantity obtained by the wireless receiver 31 and the reference physical quantity. The evaluation is not limited to good/no-good evaluation. For example, the brushing manner evaluation unit 352 may be configured to obtain, as an evaluation result, an evaluation index obtained by indexing the degree of appropriateness of the brushing action. Specifically, a numerical value that increases as the degree of appropriateness of the brushing action increases may be used as an evaluation index.

The music information storage unit 353 stores music data for playing music beforehand. The music data may be downloaded to the music information storage unit 353 through, for example, an unillustrated wireless telephone line or the Internet. The music information storage unit 353 may store a plurality of pieces of music data corresponding to a plurality of songs. The music information storage unit 353 may store a plurality of pieces of music data in which the same music is played with different musical instruments.

In the song mode, the music output unit 354 causes the speaker 33 to output music based on music information stored in the music information storage unit 353. The music output unit 354 may receive a music selecting instruction of selecting a song to be output, for example, a musical instrument selecting instruction of selecting a musical instrument, or other instructions and output music by using a song or a musical instrument in accordance with the received instruction. In the song mode, the music output unit 354 changes the output mode of music based on the evaluation result obtained by the brushing manner evaluation unit 352.

On the other hand, in the free mode, the music output unit 354 functions as a sound output unit that outputs sound based on the acceleration information obtained by the wireless receiver 31.

Figure 12:
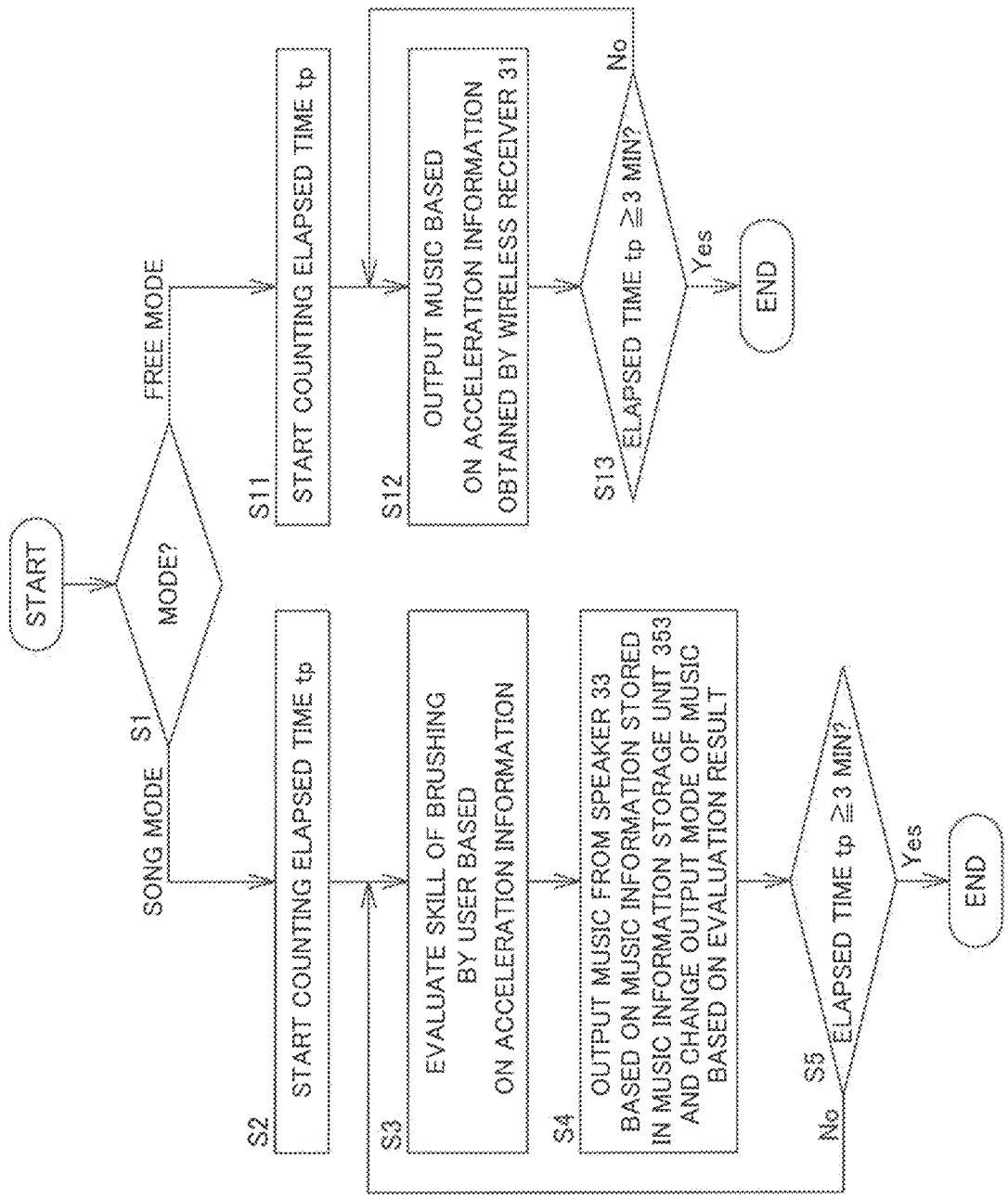
FIG. 12 is a flowchart depicting an example operation of a music output unit related to a brushing assistance program according to an embodiment of the present invention.

FIG. 12 is a flowchart depicting an example operation of the music output unit 354 related to a brushing assistance program according to an embodiment of the present invention. First, for example, when the icon corresponding to the music playing unit 35 displayed on the touch panel display 32 of the wireless terminal device 3 is touched by a user, the music playing unit 35 starts an operation, and the music playing unit 35 displays a selection screen G1 shown in FIG. 11(a) (FIG. 29(a)). Then, when the user touches the song mode button B1 in the selection screen G1 and starts brushing (song mode in step S1), the music playing unit 35 starts execution of the song mode, displays the in-brushing screen G2 shown in FIG. 11(b) (FIG. 29(b)), and starts counting an elapsed time tp with an unillustrated timer circuit (step S2).

When the in-brushing screen G2 is displayed on the touch panel display 32, the user can check the brushing action of himself/herself by seeing the user image G21 in real time in a moving image while checking the brushing position with the brushing position display image G22. Thus, the user can easily modify the brushing action of himself/herself.

The brushing position display image G22 is not limited to an example of displaying a brushing position determined by the brushing position determination unit 351. The control section 34 may sequentially indicate a brushing position at which brushing is to be performed by using the brushing position display image G22 so that brushing can be performed in a well-balanced manner with appropriate time allocation in an appropriate brushing time, such as three minutes, for each of the brushing positions of, for example, the lower right back tooth, the lower left back tooth, the upper right back tooth, the upper left back tooth, and the upper and lower anterior teeth.

To instruct the user to brush the lower right back tooth, for example, the control section 34 changes a color of a portion corresponding to the lower right back tooth in the brushing position display image G22 to red. Then, this portion is kept red for a period in which the lower right back tooth is intended to be brushed, for example, 35 seconds. In this manner, the user can be encouraged to perform brushing on the lower right back tooth for 35 seconds. In the manner described above, the brushing positions are sequentially instructed so that guidance for an appropriate brushing action can be given to the user.

Next, the brushing manner evaluation unit 352 evaluates the manner of brushing by the user based on the acceleration information obtained by the wireless receiver 31 (step S3). The evaluation of the brushing manner by the brushing manner evaluation unit 352 continues until an operation in the song mode by the music playing unit 35 finishes. A result of the evaluation is output to the music output unit 354 (output unit) substantially in real time through there is a time lag in terms of performance.

In a case where the brushing position display image G22 is used to sequentially instruct the brushing position on which brushing is to be performed, the brushing manner evaluation unit 352 may determines that brushing is good (the evaluation index is high) if the instructed position in the brushing position display image G22 and the brushing position determined by the brushing position determination unit 351 coincide with each other, or otherwise, determine that the brushing is not good (the evaluation index is low). Alternatively, the brushing manner evaluation unit 352 may evaluate whether brushing is good or not or generate an evaluation index totally by combining a plurality of evaluation methods.

Thereafter, the music output unit 354 outputs music from the speaker 33 based on music information stored in the music information storage unit 353, and the output mode of music is changed substantially in real time based on the evaluation result of the brushing manner evaluation unit 352 (step S4).

Specifically, if the evaluation result of the brushing manner evaluation unit 352 is good, original music represented by music information, that is, music pleasant to the user, is output. On the other hand, if the evaluation result of the brushing manner evaluation unit 352 is not good, the music output unit 354 outputs music deviated from original tones or disturbs the harmony or rhythm of the music to change the music into a mode that causes the user to feel uneasy or strange.

In a case where the brushing manner evaluation unit 352 obtains the evaluation result as the evaluation index described above, as the evaluation indicated by the evaluation index degrades, the music output unit 354 may increase the degree of deviation of tones, harmony, or rhythm.

Based on the physical quantity obtained by the wireless receiver 31, the control section 34 (output unit) may cause the touch panel display 32 to display a message or an image indicating whether the manner of using the toothbrush 4 is appropriate or not. The control section 34 may also cause the touch panel display 32 to display an image indicating an appropriate method for using the toothbrush 4. In this manner, it is possible to instruct the user for an appropriate brushing action. In addition, the user can perform brushing while listening to music or sound and seeing an actual brushing action of the user and an evaluation result thereof with an image or checking an appropriate brushing method. Accordingly, the user can learn an appropriate brushing method while enjoying brushing.

During the execution of step S4, the music output unit 354 may cause a RAM, for example, to store output music. During the execution of step S4, the control section 34 may cause the RAM to store a user image G21 as moving image data.

In this manner, the user feels uneasy or strange from music when the user does not appropriately perform brushing. Accordingly, the user spontaneously tries to remove the uneasiness or strangeness by returning the music to a good mode. When the user comes to perform brushing appropriately, the evaluation result of the brushing manner evaluation unit 352 becomes good, and the music changes to an original mode pleasant to the user. Accordingly, the user can feel pleasant by the music and achieve fulfillment in performing appropriate brushing, and thus, can perform brushing with joy.

If the elapsed time tp reaches a determination time tj, such as three minutes, previously set as an appropriate brushing time or more (YES in step S5), the music playing unit 35 finishes execution of the song mode, and displays the end screen G3 shown in FIG. 11(c) (FIG. 29(c)) on the touch panel display 32.

In a case where the music output unit 354 or the control section 34 stores output music or moving image data of the user image G21, the music playing unit 35 displays, on the end screen G3, a save button B3 and a share button B4 for receiving instructions of saving and sharing, respectively, of the stored music. The music playing unit 35 may store the music or moving image data stored during the brushing in, for example, a storage unit of the wireless terminal device 3 or a storage device provided in a network cloud when the save button B3 is touched by the user, for example.

On the other hand, when the user touches the free mode button B2 on the selection screen G1 to start brushing (free mode in step S1), the music playing unit 35 starts execution of the free mode, and displays the in-brushing screen G2 shown in FIG. 11(b) (FIG. 29(b)) to start counting the elapsed time tp with an unillustrated timer circuit (step S11).

Subsequently, the music output unit 354 outputs sound depending on the acceleration information obtained by the wireless receiver 31 from the speaker 33 substantially in real time (step S12). Specifically, for example, different sounds may be previously associated with a plurality of brushing positions that can be determined by the brushing position determination unit 351 so that the speaker can output sound corresponding to the brushing position determined by the brushing position determination unit 351 based on the acceleration information.

In this manner, the user can make the speaker output intended sound by changing the position on which brushing with the toothbrush 4 is performed, and thus, the user can enjoy brushing as if the user plays music.

The music output unit 354 is not limited to the example in which sound corresponding to the brushing position is output from the speaker, and the sound may be changed depending on, for example, the degree and direction of the acceleration indicated by the acceleration information and the orientation of the toothbrush 4.

In a manner similar to that during execution of step S4, during execution of step S12, the music output unit 354 may cause the RAM, for example, to store output music. During the execution of step S12, the control section 34 may cause the RAM to store the user image G21 as moving image data.

If the elapsed time tp reaches a determination time tj, such as three minutes, previously set as an appropriate brushing time or more (YES in step S13), the music playing unit 35 finishes execution of the free mode, and displays the end screen G3 shown in FIG. 11(c) (FIG. 29(c)) on the touch panel display 32, in a manner similar to that of the song mode described above. The music playing unit 35 may store the music stored during the brushing in, for example, a storage unit of the wireless terminal device 3 or a storage device provided in a network cloud when the save button B3 is touched by the user, for example.

In this manner, the user can save the music played by the user with the toothbrush 4 during the brushing and enjoy the music later, which can increase fun during the brushing.

As described above, the toothbrush attachment 2 can be attached to the typical manual toothbrush 4, and can transmit a physical quantity concerning the toothbrush 4, that is, information on a brushing action of the user, as a wireless signal. Thus, the ordinary toothbrush 4 can be used as information for transmitting information on a brushing action.

With the processes of steps S1 through S13 (the music playing unit 35), music changes in accordance with the skill of brushing by a user in the song mode. Thus, the user can learn an appropriate manner of brushing while enjoying the brushing. In the free mode, the user can play music by using the toothbrush 4 as a musical instrument, and thus, can perform brushing with fun. Consequently, the user can learn a brushing habit spontaneously.

Figure 14:
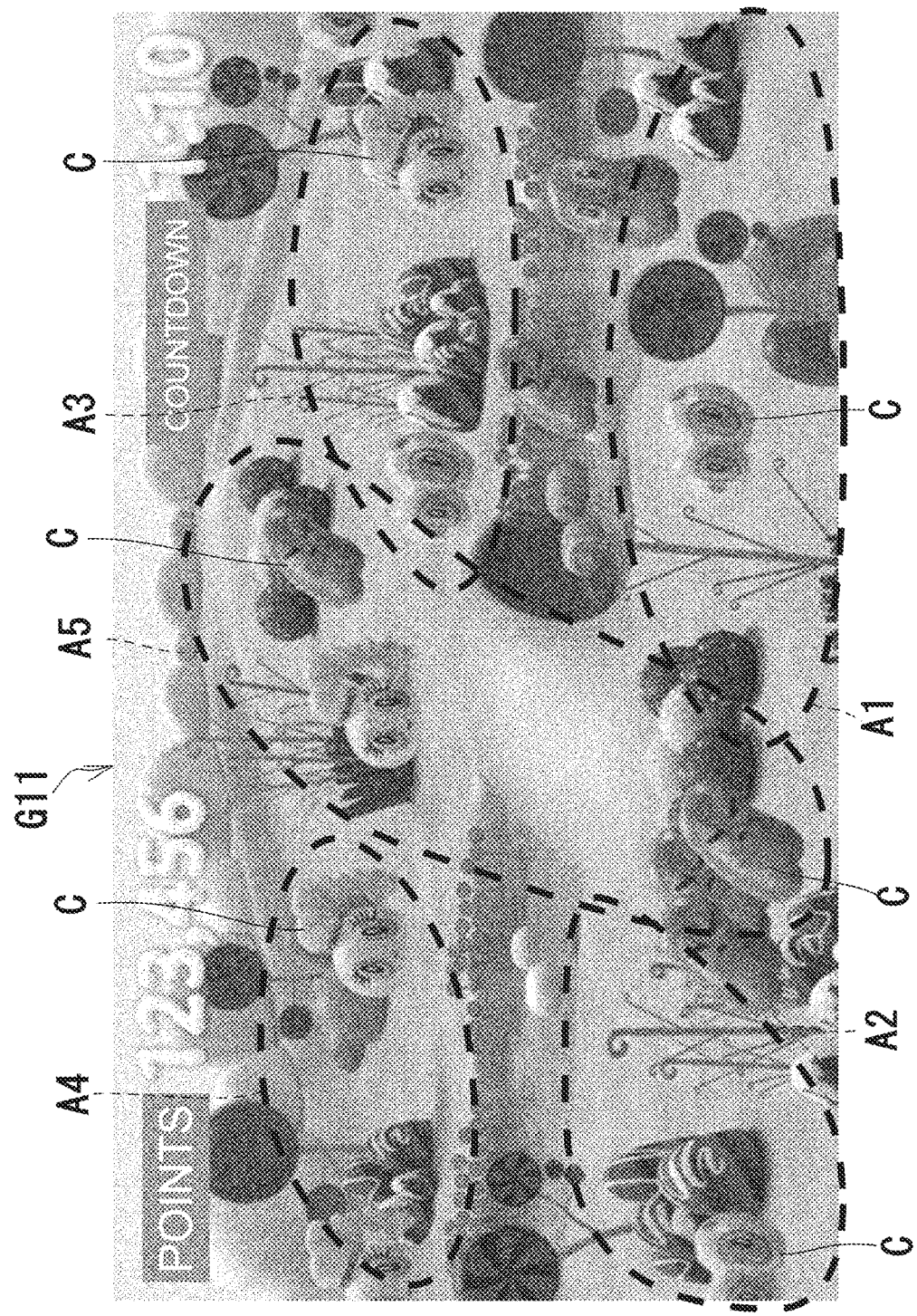
FIG. 14 is a screen view showing an example game screen.
Figure 30:
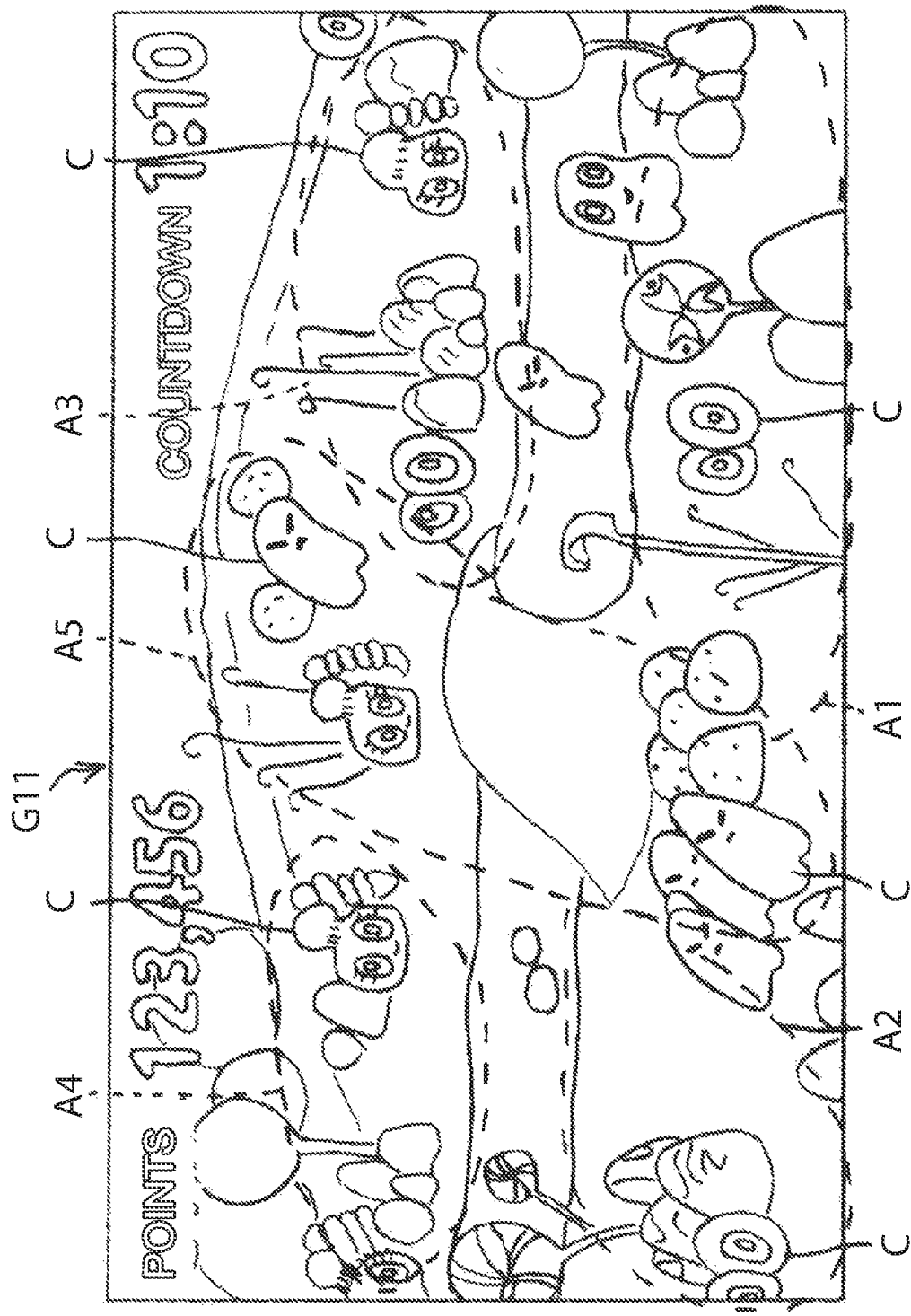
FIG. 30 is a screen of line drawing corresponding to FIG. 14.

Next, the game unit 36 will be described generally. FIG. 14 (FIG. 30) is a screen view showing an example display screen displayed on the touch panel display 32 by the game unit 36. The game screen G11 shown in FIG. 14 (FIG. 30) is divided into, for example, five areas A1, A2, A3, A4, and A5. Each area is associated with a brushing position on the teeth of the user. Each area shows a figure image C of, for example, intraoral bacteria. With the progress of brushing by the user, a figure image C in an area corresponding to the brushing position at which brushing was appropriately performed is erased. In this manner, the user can enjoy brushing as if the user plays a game.

The user can select an operation of one of the music playing unit 35, the game unit 36, and the brushing timer unit 37 by operating the touch panel display 32. Thus, the user who is a child or who prefers a simulation sense, for example, selects the game unit 36 so that the user can perform brushing with fun depending on favor of the user.

Next, parts of the game unit 36 will be specifically described with reference to FIG. 10. The brushing position determination unit 361 is similar to the brushing position determination unit 351, and thus, description thereof will not be repeated. In the above-described example, the music playing unit 35 includes the brushing position determination unit 351 and the game unit 36 includes the brushing position determination unit 361. Alternatively, the same brushing position determination unit may be shared by the music playing unit 35 and the brushing position determination unit 351.

The cleaning effect evaluation unit 362 cumulatively evaluates a cleaning effect of brushing by the user for each of five brushing positions of the lower right back tooth, the lower left back tooth, the upper right back tooth, the upper left back tooth, and the upper and lower anterior teeth determined by the brushing position determination unit 361. Specifically, the cleaning effect evaluation unit 362 calculates a travel distance of one brushing based on, for example, acceleration information.

The cleaning effect evaluation unit 362 integrates the thus-obtained travel distances of brushing for each brushing position determined by the brushing position determination unit 361. The travel distance of brushing is assumed to correspond to a cleaning effect of teeth by brushing. Thus, an integrated value Sx of travel distances for each brushing position represents a cleaning effect at the brushing position. In view of this, the cleaning effect evaluation unit 362 can use the integrated value Sx as a cumulative cleaning evaluation result by brushing at each brushing position.

The cleaning effect evaluation unit 362 is not limited to the example in which the integrated value Sx is used as a cumulative cleaning evaluation result. For example, an evaluation index obtained by adding an evaluation result of the brushing manner evaluation unit 352 to the travel distance of brushing may be calculated and used as a cumulative cleaning evaluation result, or other evaluation methods may be used.

The figure display control unit 363 previously sets a brushing travel distance necessary for appropriate cleaning at each brushing position as a determination reference value Sj (reference cleaning level), and displays a figure image C in an area corresponding to a brushing position at which the integrated value Sx as a cleaning evaluation result by the cleaning effect evaluation unit 362 is less than or equal to the determination reference value Sj. If the integrated value Sx exceeds the determination reference value Sj, the figure display control unit 363 erases the figure image C displayed in the area corresponding to this brushing position. The figure image C may be a still image or a moving image. The figure display control unit 363 corresponds to an example of an output unit that outputs a still image or a moving image.

Figure 13:
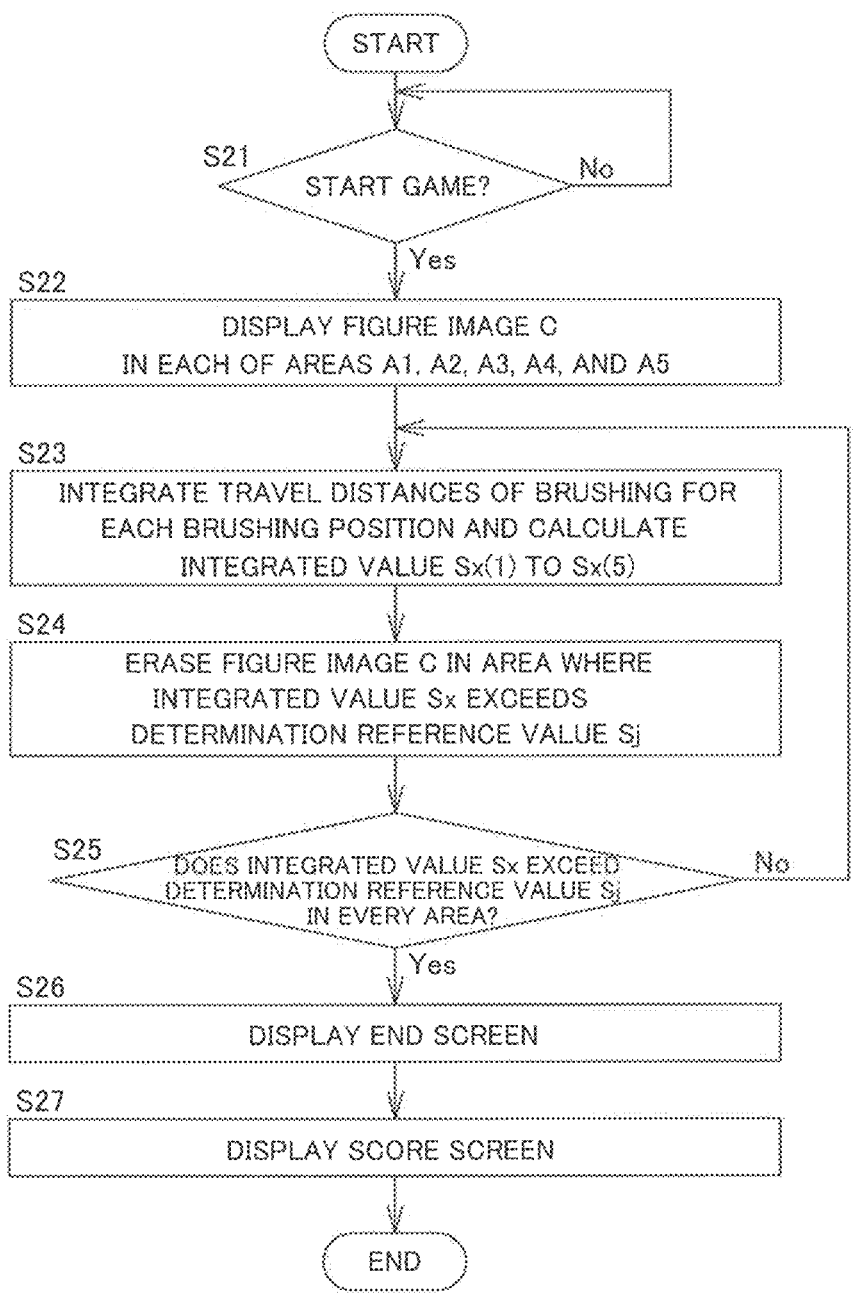
FIG. 13 is a flowchart depicting an example operation of a game unit related to the brushing assistance program according to the embodiment of the present invention.

FIG. 13 is a flowchart depicting an example operation of the game unit 36 concerning a brushing assistance program according to an embodiment of the present invention. First, when a user touches an icon corresponding to the game unit 36 displayed on the touch panel display 32 of the wireless terminal device 3, for example, the game unit 36 starts a game (YES in step S21).

Next, since integration of integrated values Sx has not been started yet and integrated values Sx(1) through Sx(5) corresponding to the areas are the determination reference value Sj or less, the figure display control unit 363 causes a figure image C to be displayed on each of the areas A1, A2, A3, A4, and A5 of the game screen G11 in the same manner as that of the game screen G11 shown in FIG. 14 (FIG. 30), for example (step S22).

Thereafter, the cleaning effect evaluation unit 362 calculates a travel distance of one brushing based on acceleration information for each of the five brushing positions of the lower right back tooth, the lower left back tooth, the upper right back tooth, the upper left back tooth, and the upper and lower anterior teeth determined by the brushing position determination unit 361. Then, the cleaning effect evaluation unit 362 integrates the thus-obtained travel distances of brushing for each of the brushing positions determined by the brushing position determination unit 361 (step S23).

Here, suppose the integrated value Sx corresponding to the lower right back tooth is an integrated value Sx(1), the integrated value Sx corresponding to the lower left back tooth is an integrated value Sx(2), the integrated value Sx corresponding to the upper right back tooth is an integrated value Sx(3), the integrated value Sx corresponding to the upper left back tooth is an integrated value Sx(4), and the integrated value Sx corresponding to the upper and lower anterior teeth is an integrated value Sx(5).

On the other hand, in the areas of the game screen G11, the area A1 corresponds to the lower right back tooth, the area A2 corresponds to the lower left back tooth, the area A3 corresponds to the upper right back tooth, the area A4 corresponds to the upper left back tooth, and the area A5 corresponds to the upper and lower anterior teeth. Accordingly, the area A and the integrated value Sx corresponding to the same brushing position are associated with each other, and the areas A1, A2, A3, A4, and A5 are associated with the integrated values Sx(1), Sx(2), Sx(3), Sx(4), and Sx(5), respectively.

Figure 15:
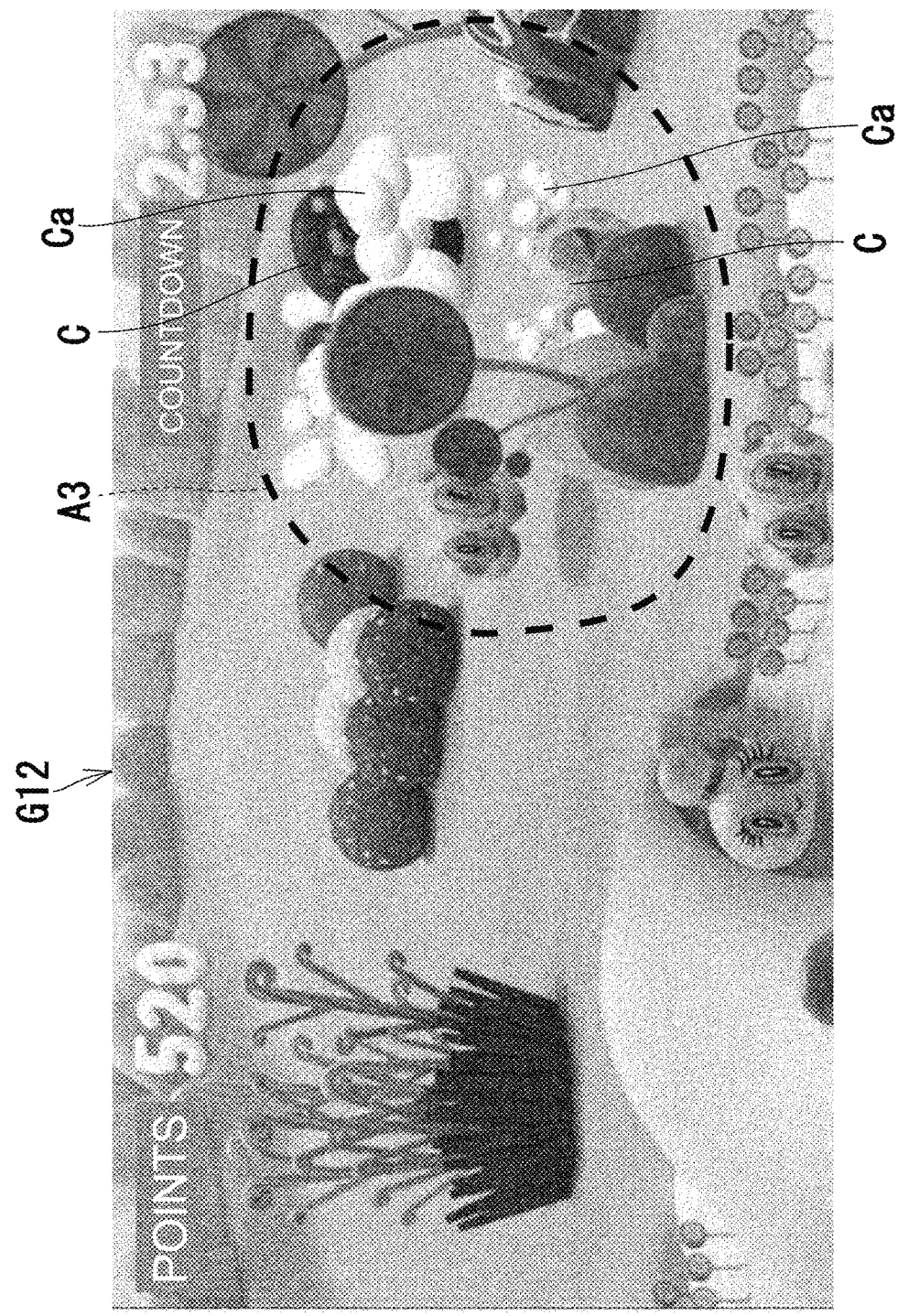
FIG. 15 is a screen view showing an example display screen during brushing by a user.

FIG. 15 (FIG. 31) is a screen view showing an example of the display screen G12 during brushing by the user. In an example of the mode of FIG. 15 (FIG. 31), when the user brushes the upper back teeth with the toothbrush 4, the figure display control unit 363 (display control section) displays, in an enlarged manner, an image of the area A3 corresponding to the brushing position determined by the brushing position determination unit 361 as shown in FIG. 15 (FIG. 31). In addition, the figure display control unit 363 (display control section) displays a bubble image Ca that looks like bubbles, for example, so that the bubble image Ca overlaps the figure image C in the area A3 or appears near the figure image C. By displaying an image that reminds the user of cleaning or becoming clean, such as the bubble image Ca, a sense of linkage between the brushing action of the user and the display screen G12 can be invoked to the user. As a result, the user can be made feel comfortable as if the teeth of the user are cleaned by the bubble image Ca.

Since an image in an area corresponding to the brushing position determined by the brushing position determination unit 361 is displayed in an enlarged manner by the figure display control unit 363, the display screen changes when the user changes the brushing position. When a brushing action with the toothbrush 4 is detected based on acceleration information, for example, only in a case where a figure image C is present in an area corresponding to the brushing position determined by the brushing position determination unit 361, the figure display control unit 363 (display control section) displays a bubble image Ca overlapping, or appearing near, the figure image C. In addition, when the user changes the brushing position, the figure display control unit 363 (display control section) displays an image in an area corresponding to the brushing position determined by the brushing position determination unit 361 in an enlarged manner. In this manner, by changing the display screen depending on the brushing action of the user, enjoyment of brushing can be enhanced.

In another example of the mode of FIG. 15 (FIG. 31), the storage unit may previously store cleaning order information indicating the brushing order in which brushing is to be performed on brushing positions (cleaning sites), for example. When a brushing operation with the toothbrush 4 is detected based on acceleration information, for example, the figure display control unit 363 (display control section) may sequentially display, in an enlarged manner, an image in an area corresponding to the brushing position to be cleaned in the order indicated by the cleaning order information so that the user is guided to brush the brushing position corresponding to the area displayed in the enlarged manner.

In this manner, when the position of brushing by the user is guided in enlarged display of an image and brushing is performed appropriately at this brushing position, the brushing position determined by the brushing position determination unit 361 and the brushing position corresponding to the area displayed in the enlarged manner coincide with each other. In view of this, only in a case where the brushing position corresponding to the area displayed the enlarged manner and the brushing position determined by the brushing position determination unit 361 coincide with each other and a figure image C is present in the area corresponding to the brushing position, the figure display control unit 363 (display control section) displays the bubble image Ca overlapping, or appearing near, the figure image C.

In this manner, in a case where the user wants to display a bubble image Ca, the user needs to perform brushing at the brushing position guided by the enlarged display of the image, and consequently, the user brushes the brushing positions in the order indicated by the cleaning order information. As a result, the user can learn a favorable brushing operation.

The bubble image Ca is not limited to the example in which the bubble image Ca is displayed only in the presence of a figure image C. The figure display control unit 363 (display control section) may display a bubble image Ca in an image position (area) corresponding to the brushing position determined by the brushing position determination unit 361, irrespective of whether the figure image C is present or not. In this case, the user can know the position of brushing by the user depending on the position at which the bubble image Ca is displayed. Accordingly, the user can perform brushing at an appropriate brushing position by changing the brushing position so that a bubble image Ca displayed on the screen moves toward the figure image C.

Thereafter, the figure display control unit 363 compares each of the integrated values Sx(1) through Sx(5) with the determination reference value Sj. If one of the integrated values Sx exceeds the determination reference value Sj, the figure image C displayed in the area corresponding to this integrated value Sx, that is, the area where the integrated value Sx exceeds the determination reference value Sj, is erased (step S24).

Figure 16:
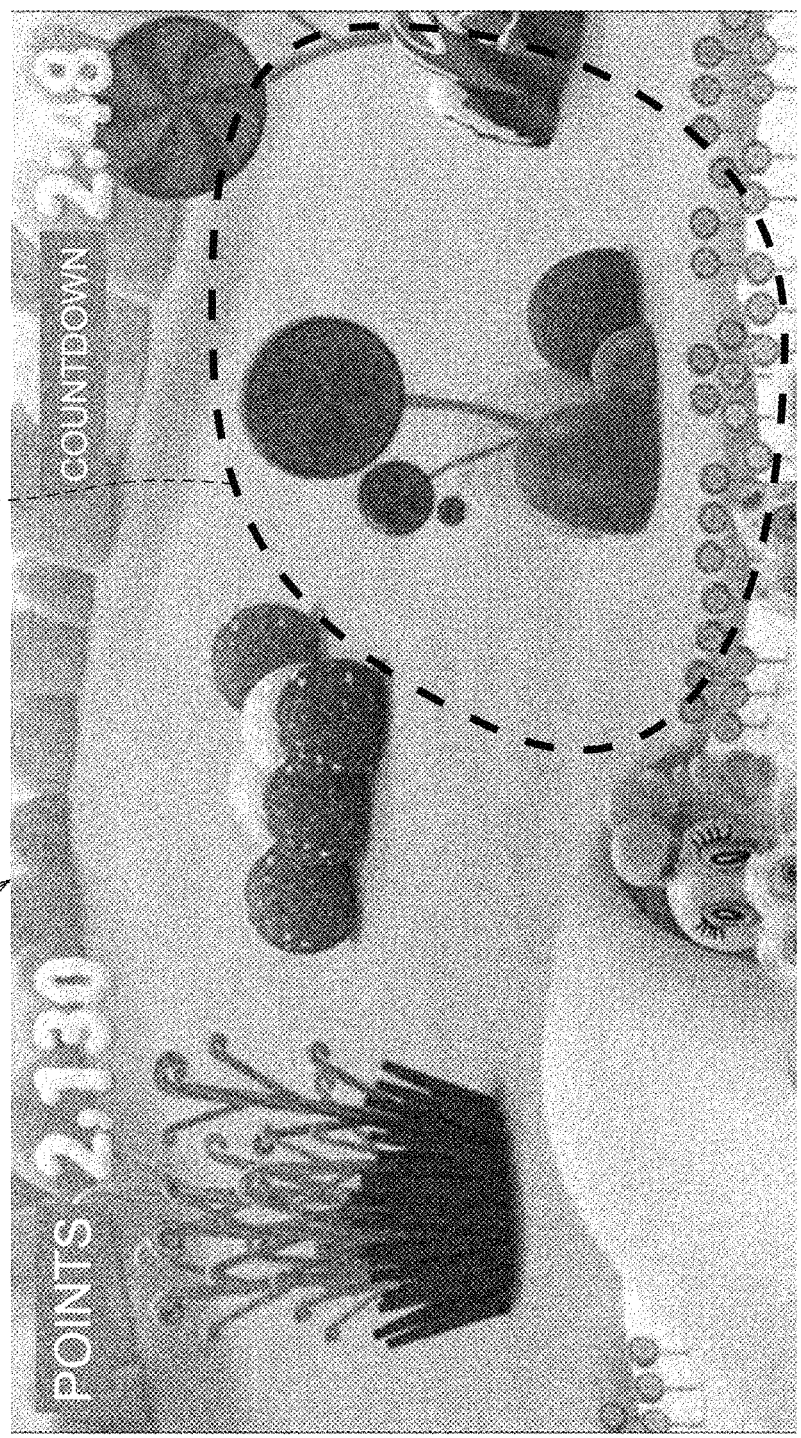
FIG. 16 is a screen view showing an example display screen in a case where an integrated value exceeds a determination reference value.

FIG. 16 (FIG. 32) is a screen view showing an example of the display screen G13 in a case where the integrated value Sx(3) exceeds the determination reference value Sj. As illustrated in FIG. 16 (FIG. 32), when the integrated value Sx(3) exceeds the determination reference value Sj, the figure display control unit 363 erases a figure image C from the area A3. With this operation, the user can know that the user appropriately brushed the upper right back tooth corresponding to the area A3. In addition, the user can be provided with a sense as if the user won the figure image C of intraoral bacteria in a game sense so that enjoyment in brushing can be enhanced. In this manner, while enjoyment of the user is enhanced, information on the brushing action of the user can be announced.

Figure 17:
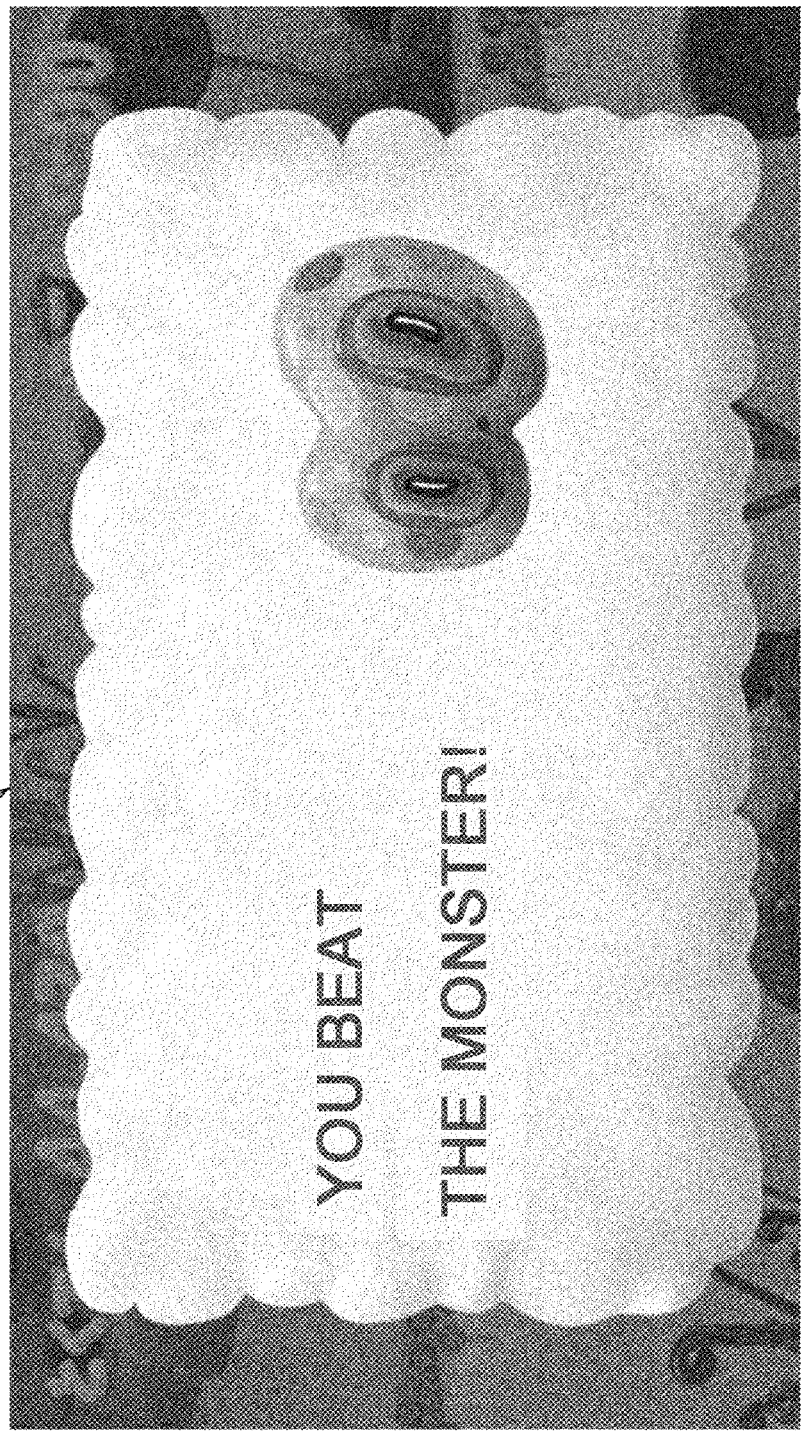
FIG. 17 is a screen view showing an example game end screen.

Then, the game unit 36 compares each of the integrated values Sx(1) through Sx(5) with the determination reference value Sj. If at least one of the integrated values Sx(1) through Sx(5) does not exceed the determination reference value Sj yet (NO in step S25), steps S23 through S25 are repeated. On the other hand, if all the integrated values Sx(1) through Sx(5) exceed the determination reference value Sj (YES in step S25), the game unit 36 displays a game end screen G14 as shown in FIG. 17(FIG. 33), for example (step S26).

The game unit 36 may count an elapsed time tp after the start of the game in step S21, and when the elapsed time tp reaches the determination time tj (e.g., three minutes) previously set as an appropriate brushing time or more, the game unit 36 proceeds to step S26.

In this manner, excessive brushing of teeth can be prevented. In addition, the user can be guided to perform brushing in an appropriate brushing time.

The game end screen G14 preferably displays message such as to enhance the sense of accomplishing the game, which could be, for example, "You beat the monster!" or "Your monster conquest success rate is XX %". This message can enhance fulfillment of brushing with a sense of unity with the game and induce willingness to perform the brushing game again. Thus, brushing can be made habitual.

Figure 18:
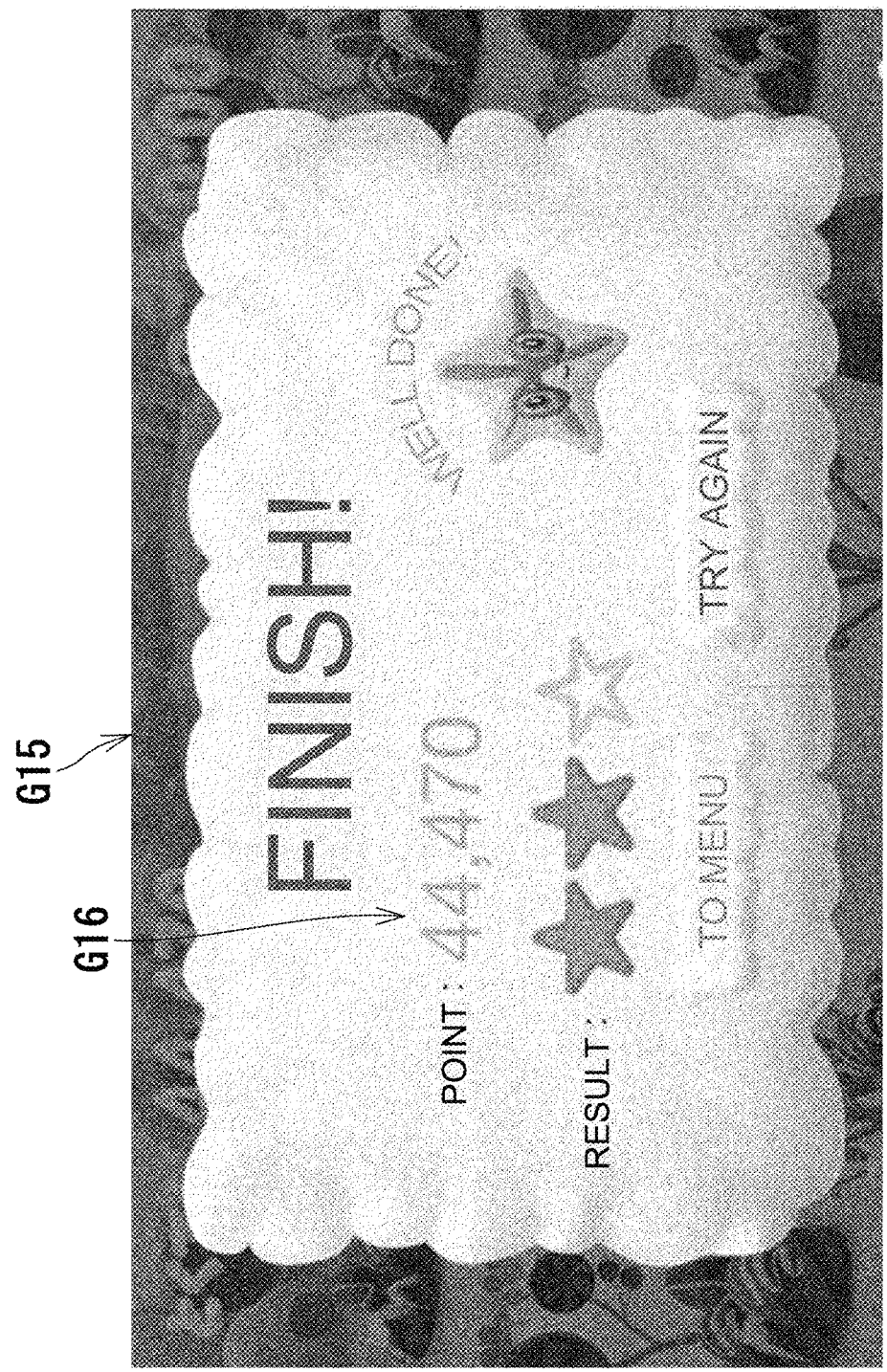
FIG. 18 is a screen view showing an example score screen.

Then, the game unit 36 displays a score screen G15 as shown in FIG. 18 (FIG. 34), for example (step S27). The game unit 36 can calculate scores so that the score increases as the integrated values Sx(1) through Sx(5) increases, or can calculate the scores so that the score increases as the time in which the brushing manner evaluation unit 352 provided in the game unit 36 determines that brushing is good approaches a predetermined time.

In this manner, by displaying the score of brushing, a feeling of eagerness of increasing the score can be induced to the user so that the user comes to want to perform the brushing game again. Thus, brushing can be made habitual.

The game unit 36 may conduct a logging operation in the storage unit for scores, more detailed evaluation results, etc. The game unit 36 may take an average of results for each game (brushing) or in a predetermined period specified by the user, for example, to announce the result with the touch panel display 32 or the speaker 33 based on numbers, ranking, or other expression methods. A server device accessible from the wireless terminal device 3 through a communication network such as an unillustrated telephone line or the Internet may be provided so that the game unit 36 can cause the server device to store the score, the more detailed evaluation results, and the average data, for example, and performs a logging operation on the server device.

The score and other data may be transmitted from wireless terminal devices 3 of a plurality of users to the server device so that the server device calculates ranking among the users or compares the scores of the users with one another. The server device may transmit the ranking or comparison result to the wireless terminal devices 3 of the users. In this manner, enjoyment in brushing can be enhanced. Such a ranking or logging operation, for example, of the evaluation result is convenient especially for a user who wants to learn an appropriate brushing action and a user who wants a child to learn an appropriate brushing action.

With reference to FIG. 10, parts of the brushing timer unit 37 will now be specifically described. The brushing start determination unit 371 determines whether brushing by the user is started or not based on acceleration information obtained by the wireless receiver 31. Specifically, based on the acceleration information, for example, when the acceleration along the longitudinal direction of the toothbrush 4 exceeds a predetermined start determination value ST, the brushing start determination unit 371 determines that brushing is started.

If the brushing start determination unit 371 determines that brushing starts, the timer unit 372 starts counting an elapsed time tp until a determination time tj previously set at, for example, three minutes as a preferable brushing time has elapsed.

From when the brushing start determination unit 371 determines that brushing is started until when the elapsed time tp reaches the determination time tj, the notification unit 373 notifies the user of predetermined information with the speaker 33 or the touch panel display 32 by using sound and/or a text image. The text image may be a still image or a moving image with a flow of characters. The notification unit 373 may cause the touch panel display 32 to display a still image or a moving image concerning predetermined information.

Figure 19:
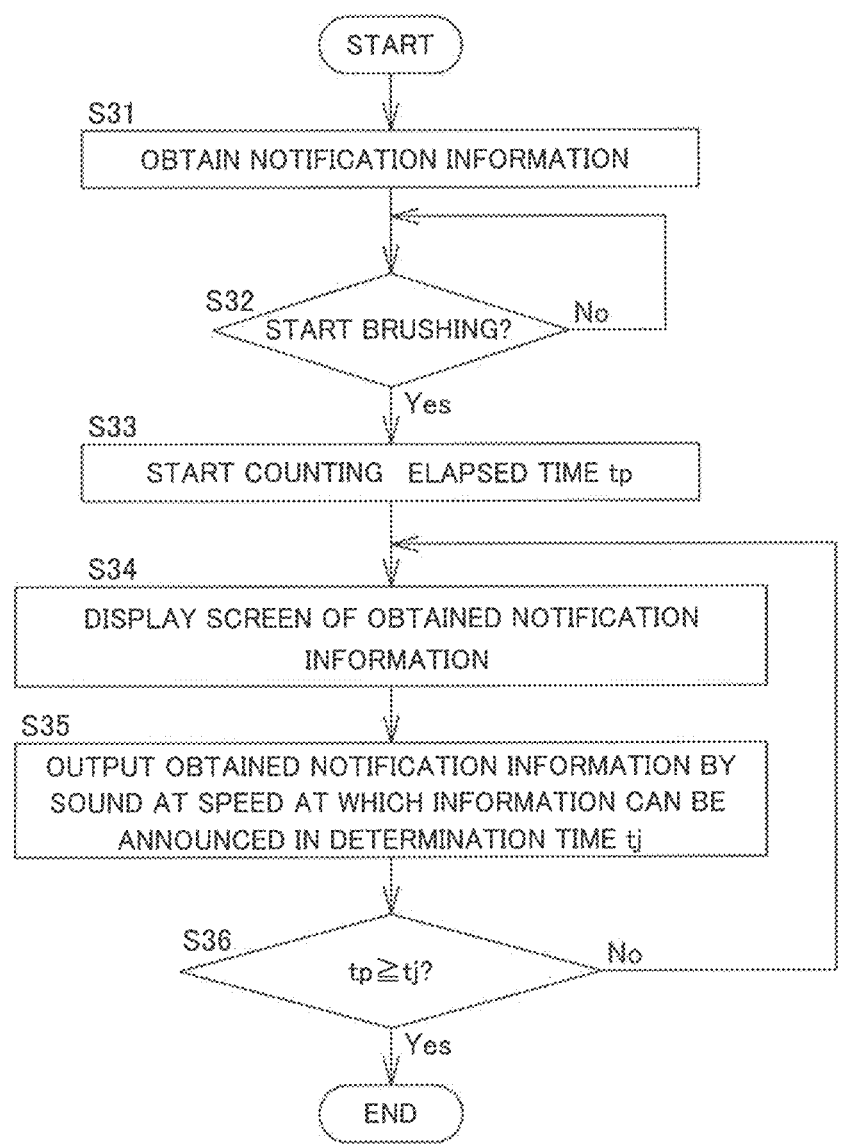
FIG. 19 is a flowchart depicting an example operation of a brushing timer unit related to the brushing assistance program according to the embodiment of the present invention.
Figure 20C:
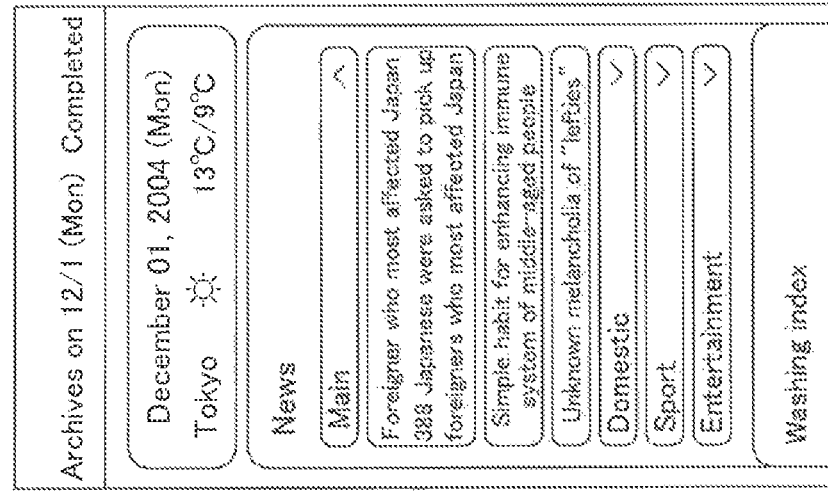
FIG. 20A, FIG. 20B and FIG. 20C show screen views illustrating example display screens displayed on a touch panel display of a wireless terminal device.
Figure 20B:
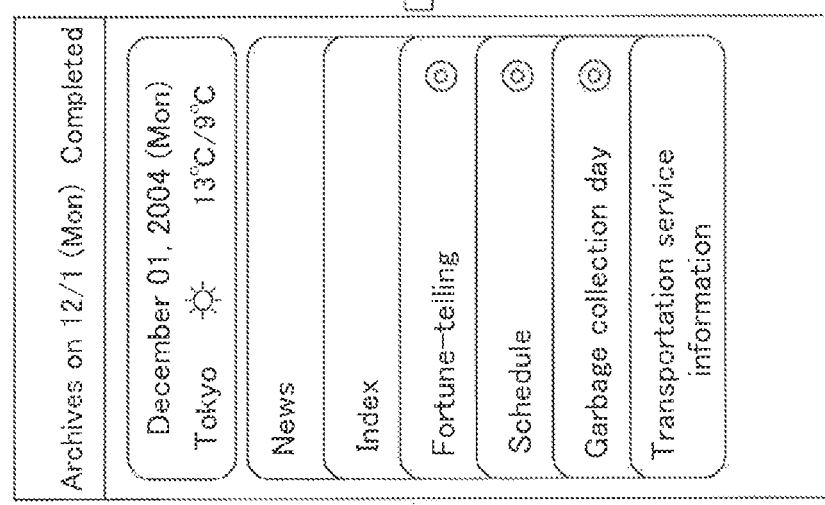
Figure 20A:
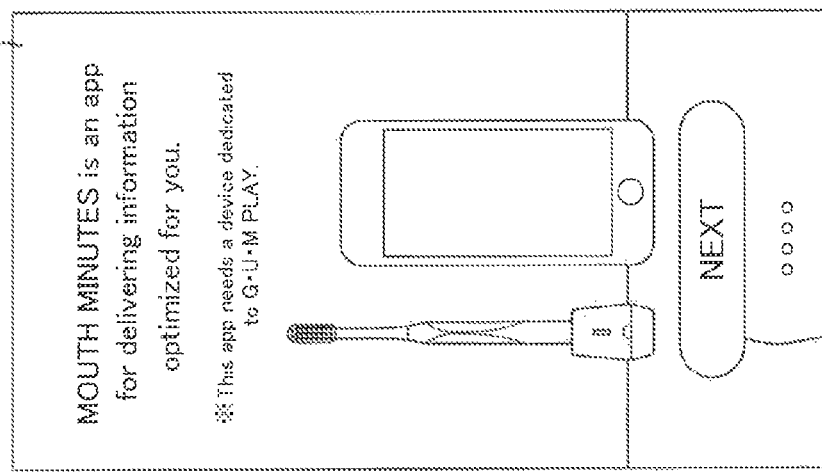

FIG. 19 is a flowchart depicting an example operation of the brushing timer unit 37 related to a brushing assistance program according to an embodiment of the present invention. FIG. 20A, FIG. 20B and FIG. 20C show screen views illustrating example display screens displayed on the touch panel display 32 of the wireless terminal device 3. First, when a user touches an icon corresponding to the brushing timer unit 37 displayed on the touch panel display 32 of the wireless terminal device 3, for example, a start screen G31 illustrated in FIG. 20(*a*) is displayed, and the notification unit 373 obtains notification information for notification during brushing by the user (step S31).

Specifically, the notification unit 373 obtains notification information stored in an external server through, for example, an unillustrated wireless telephone line or the Internet. For example, the notification unit 373 can obtain notification information from the outside by using an application programming interface (API) that is an interface for using the function of the world wide web (Web) from the outside.

Examples of the notification information include a weather forecast, news, indexes such as an umbrella index, a washing index, and a parasol index, fortune-telling, schedules, garbage collection days, and transportation service information.

Then, when the user touches a next button G32 in the start screen G31, for example, the brushing start determination unit 371 determines whether brushing is started or not (step S32). If the brushing start determination unit 371 determines that brushing is started (YES in step S32), the timer unit 372 starts counting an elapsed time tp (step S33).

Thereafter, as shown in FIGS. 20(*b*) and 20(*c*), for example, the notification unit 373 displays notification information on the touch panel display 32 as text information (step S34). The notification unit 373 also causes the speaker 33 to output notification information by sound (step S35). In step S31, data representing the notification information by sound may be obtained so that the notification information may be announced by sound based on the data, or notification information obtained as character-string data is converted to sound and is read aloud so that notification is announced by sound.

The elapsed time tp may be displayed on the display screens illustrated in in FIGS. 20(*b*) and 20(*c*) by using a text or an image simulating an analog clock.

The notification unit 373 causes the speaker 33 to output the notification information obtained in step S31 with the speed of the sound output appropriately adjusted so that notification can be issued within the determination time tj. In this case, the time of sound output of the notification information is preferably adjusted so that this time is approximately equal to the determination time tj, for example, within the range from 90% or more of the determination time tj to the determination time tj. Since the time of sound output of the notification information is made approximately equal to the determination time tj, the user continues brushing while sound output of the notification information is performed, and thereby, can perform appropriate brushing.

Then, the timer unit 372 compares the elapsed time tp and the determination time tj (step S36). If the elapsed time tp is less than the determination time tj (NO in step S36), the timer unit 372 repeats steps S34 through S36 again, and if the elapsed time tp reaches the determination time tj or more (YES in step S36), the timer unit 372 displays an unillustrated end screen and finishes the process.

As described above, through the processes of steps S31 through S36, notification information is announced from when the user starts brushing until when the determination time tj appropriate for brushing has elapsed, and thus, the user performs brushing while the notification information is being announced and, thereby, can perform brushing appropriately. Since the notification information is announced during the brushing, the user can effectively utilize the brushing time. In addition, since the notification information is output by sound, the user can perform brushing while listening to the notification information and watching at a mirror.

Since counting of the elapsed time tp starts after the brushing start determination unit 371 determines that brushing is started based on the acceleration information, the accuracy in counting the elapsed time tp is enhanced as compared to the case of starting counting by user's operation of a start button, for example. Since announcement of the notification information by the notification unit 373 is started based on the acceleration information, at least one of an image or sound of the notification information is output in a mode of enhancing enjoyment of the user.

The notification unit 373 may perform one of step S34 or S35. The notification unit 373 is not limited to the example in which the notification unit 373 appropriately adjusts the speed of sound output to enable the notification information to be announced within the determination time tj. For example, the notification information may be summarized or at least partially omitted so that the notification information can be announced within the determination time tj.

The brushing timer unit 37 may not include the brushing start determination unit 371, and in step S32, for example, may perform step 333 assuming that the user starts brushing based on user's touch on, for example, the next button G32 (start instruction receiving unit).

The music playing unit 35 may include a brushing start determination unit 371 so that after determination of the mode in step S1, step S2 or step 311 is performed after the brushing start determination unit 371 determines that brushing is started.

In addition to the mode in which the toothbrush attachment 2 can be removably attached to a normal manual toothbrush including a brush unit and a grip unit (handle), for example, that are integrally formed, the toothbrush attachment 2 may employ a mode in which a member including a grip unit is configured as the toothbrush attachment 2 in a manual toothbrush in which a member including a brush unit is can be removably attached to a member including the grip unit. The toothbrush attachment 2 may be configured to be removably attached to an electric toothbrush. In particular, in the case of an electric toothbrush that only causes small strokes of back-and-forth movement in a brush unit and has low cleaning performance, for example, the electric toothbrush needs to be manually moved back and forth for brushing. Attachment of the toothbrush attachment 2 to such an electric toothbrush requiring manual brushing operation enables obtainment of information on a brushing action of a user, can enhance enjoyment in brushing, and can instruct an appropriate brushing method, in a manner similar to the case of attaching the toothbrush attachment 2 to a manual toothbrush.

The wireless terminal device 3 (brushing assistance device) may not include any of the game unit 36 and the brushing timer unit 37. The music playing unit 35 may be configured to perform only one of the song mode or the free mode. The wireless terminal device 3 may not include any of the music playing unit 35 and the brushing timer unit 37, and may not include any of the music playing unit 35 and the game unit 36.

The circuit block 207 (toothbrush module) may be integrated with the electric toothbrush or incorporated in the electric toothbrush. The electric toothbrush may be configured to need no manual brushing operation or may need a manual brushing operation.

The wireless terminal device 3 may include an image storage unit that stores various images such as a calendar and a landscape photograph, and the control section 34 may cause the touch panel display 32 to display these images during brushing by a user.

The wireless terminal device 3 (control section 34) may be configured to calculate, as information on a brushing action of a user, a contact angle at which a brush unit (bristle tufts 421), especially bristle ends, of the toothbrush 4 contacts gums or the teeth, and the degree of displacement of an operation of repetitive movement (brushing) of the toothbrush 4, for example, from the physical quantity obtained by the wireless receiver 31, execute evaluation of a cleaning action at each cleaning site based on the information, and announce the information and the evaluation result with the touch panel display 32 or the speaker 33.

The wireless terminal device 3 (control section 34) may be configured to form an image of information on a brushing action of the user and, based on a simplified image of the toothbrush 4, causes the touch panel display 32 to display the contact angle or the degree of displacement of brushing, for example.

The brushing assistance system 1 may be configured as a brushing evaluation system including none of the music output unit 354 and the figure display control unit 363.

An evaluation method of the manner of brushing by the brushing manner evaluation unit 352 will now be specifically described. The brushing manner evaluation unit 352 is not limited to the example of operating as a part of the music playing unit 35, and the brushing manner evaluation unit 352 may be included in the music playing unit 35, the game unit 36, and the brushing timer unit 37. The brushing manner evaluation unit 352 may also evaluate a brushing action of a user, separately from the music playing unit 35, the game unit 36, and the brushing timer unit 37.

As an evaluation method of the manner of brushing by the brushing manner evaluation unit 352, an evaluation method as described below may be employed, for example.

First, as a brushing method, there are various known brushing methods, such as a Bass method of horizontally moving the bristle tufts 421 of the toothbrush 4 back and forth while tilting the toothbrush 4 to the gum by 45 degrees, a scrubbing method of horizontally moving the bristle tufts 421 back and forth with the bristle tufts 421 being pressed against the teeth perpendicularly to the teeth, and a rolling method of rolling the bristle tufts 421 toward the occlusal plane with a side portion of the bristles of the bristle tufts 421 brought into contact with the gum. Among these methods, the Bass method is considered as a basic brushing method.

In the Bass method, the toothbrush is moved back and forth in tiny strokes to perform brushing. At this time, the range of strokes of the back-and-forth movement of the brush, that is, the travel distance of a one-way stroke in the back-and-forth movement, is preferably within a range corresponding to the width of one tooth. A smaller range of the brush movement means a higher quality of brushing and skilled brushing, whereas a larger range of the brush movement means a lower quality of brushing and poor brushing.

In view of this, the range of brush movement can be used as an index for evaluating the skill of the manner of brushing by a user.

The manner of brushing by a user may be evaluated based on a comparison with a brushing action by a specialist in brushing, such as a dentist or a dental hygienist, that is, a brushing action considered to be ideal. Specifically, a brushing action by a specialist in brushing such as a dentist or a dental hygienist is previously measured, and data is made for this brushing operation. Based on the thus-obtained data, an evaluation reference table (look-up table: LUT) for determining a brushing action of the user is set beforehand, and is stored in a storage unit of the control section 34 beforehand.

Based on the evaluation reference table, a quality evaluation criterion for evaluating a brushing action of the user is defined in such a manner that brushing is determined to be better as the difference between data indicating a brushing action of the user obtained by the toothbrush attachment 2 and the brushing action by the specialist decreases, and brushing is determined to be poorer as the difference increases. The brushing manner evaluation unit 352 preferably evaluates the manner of brushing of the user based on this quality evaluation criterion.

Specifically, the evaluation reference table can be, for example, a look-up table in which brushing speed information indicating the brushing speed of brushing by a specialist and a frequency determination value for determining a brushing frequency that is the number of strokes in the back-and-forth movement in a predetermined time (e.g., one second) of the brushing are combined in association with each other.

The frequency determination value, the brushing speed information, and the combination thereof can be set in, for example, the following manner. Specifically, in each combination of the repetitive frequency of strokes in the back-and-forth movement of the toothbrush and the brushing speed information indicating the travel speed of the brush obtained when this repetitive frequency is obtained in the brushing action by the specialist, for example, a predetermined range, such as an upper limit and a lower limit indicating the range of plus or minus about 5%, of the repetitive frequency in the combination, for example, may be set as a frequency determination value for the combination. The evaluation reference table can be a look-up table in which the thus-obtained frequency determination value and brushing speed information are combined and associated with each other. Since the travel speed of the brush and the acceleration are correlated with each other, the acceleration may be used as the brushing speed information instead of the speed.

The brushing action by the specialist in brushing is considered to have a small range of movement of the brush, and thus, according to the evaluation method based on the evaluation reference table, consequently, it will be determined that a smaller range of brush movement in brushing means better brushing and a wider range means poorer brushing.

Figure 21:
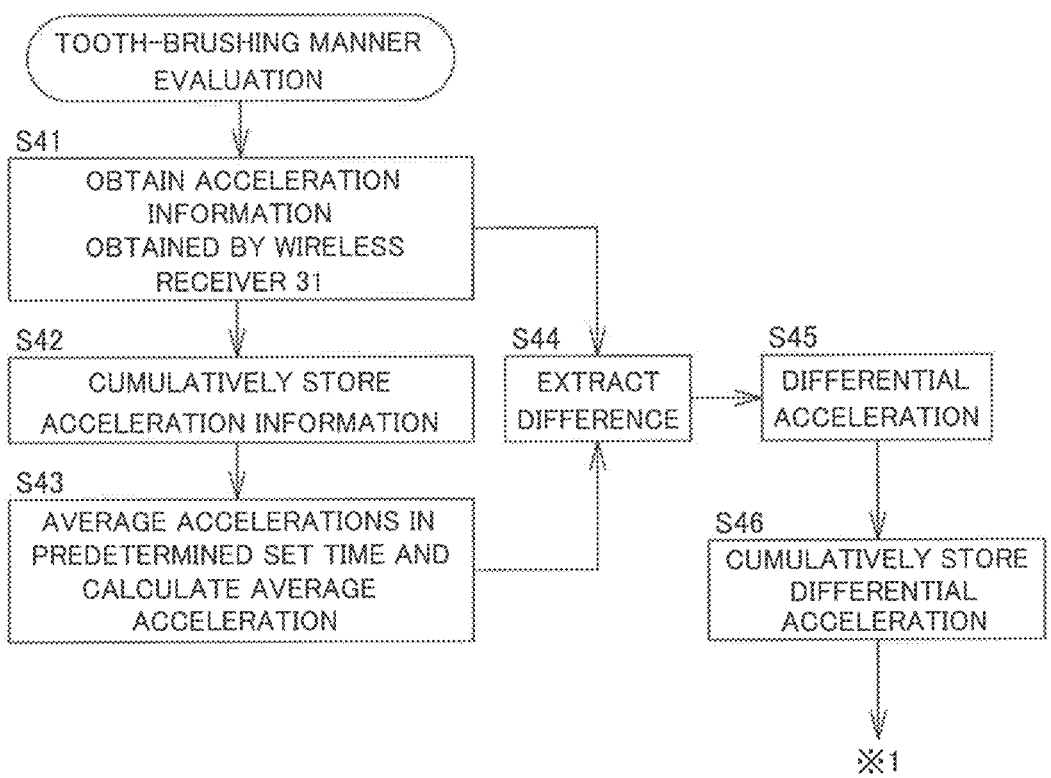
FIG. 21 is a flowchart depicting an example operation in a case where a brushing manner evaluation unit illustrated in FIG. 10 performs an evaluation method based on an evaluation reference table.
Figure 22:
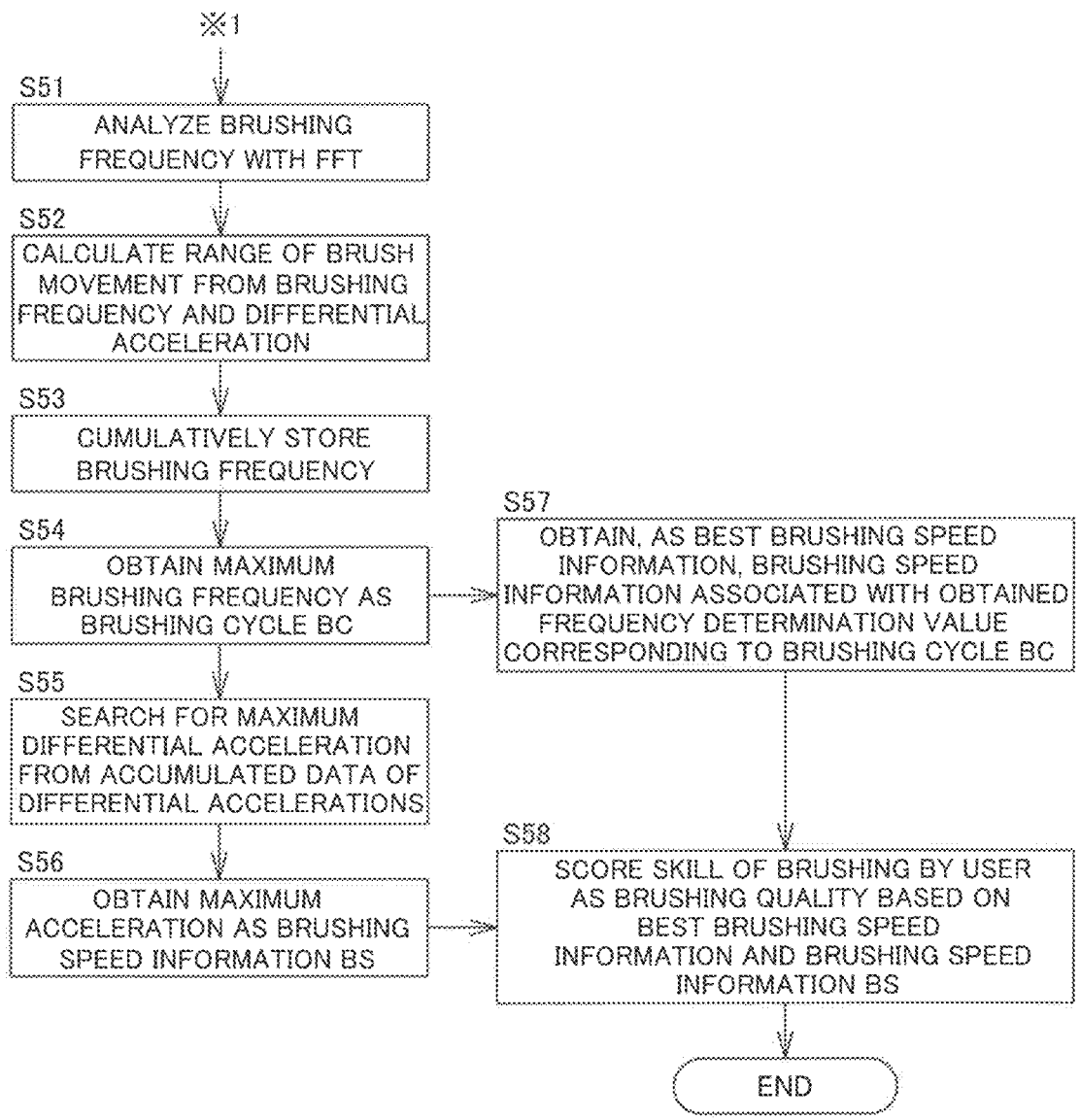
FIG. 22 is a flowchart depicting an example operation in a case where the brushing manner evaluation unit illustrated in FIG. 10 performs the evaluation method of the evaluation reference table.

FIGS. 21 and 22 are flowcharts showing an example operation in a case where the brushing manner evaluation unit 352 illustrated in FIG. 10 performs an evaluation method based on the evaluation reference table. First, the brushing manner evaluation unit 352 obtains acceleration information detected and transmitted by the toothbrush attachment 2 and obtained by the wireless receiver 31 (step S41). The sensor unit 21 that detects the acceleration sensor is a three-axis acceleration sensor, and detects accelerations in three directions of X, Y, and Z that are orthogonal to one another. For example, the direction Y is the axial direction of the handle 41, the direction X is a direction along which the bristle tufts 421 extend, and the direction Z is a direction orthogonal to directions X and Y. In this manner, the acceleration information indicating accelerations in the directions X, Y, and Z is obtained.

Next, the brushing manner evaluation unit 352 causes the storage unit of the control section 34 to cumulatively store the thus-obtained acceleration information in chronological order (step S42). That is, when a user performs brushing, acceleration information is detected and transmitted by the toothbrush attachment 2 and is received by the wireless receiver 31 during the brushing, and the acceleration information is cumulatively stored in the storage unit.

Thereafter, the brushing manner evaluation unit 352 obtains an average of accelerations within a predetermined set time, that is, accelerations in each of the directions X, Y, and Z within the predetermined set time, and outputs an average acceleration represented by a three-dimensional vector of X, Y, and Z (step S43). The gravity of the earth is always detected as constant acceleration by the sensor unit 21. Thus, when accelerations cumulatively stored in chronological order are averaged, acceleration of the gravity component that is constantly detected is high. As a result, the average acceleration indicates an approximate gravitational acceleration.

The thus-obtained average acceleration is used as information indicating the gravity direction, and is used for, for example, detecting the orientation of the toothbrush 4 described above.

Subsequently, the brushing manner evaluation unit 352 extracts a difference between the acceleration information obtained in step S41, that is, real-time acceleration information at the current time, and the average acceleration obtained in step S43 (step S44), and obtains a differential acceleration (step S45). As described above, since it is assumed that the average acceleration is equal to the approximate gravitational acceleration, the differential acceleration is assumed to indicate acceleration exerted on the toothbrush 4 by brushing. In the Bass method or the scrubbing method, the toothbrush is basically moved in a direction along the axis of the handle thereof. In view of this, in the case of performing a brushing manner evaluation assumed to be performed by the Bass method or the scrubbing method, acceleration in a direction Y component along the axial direction of the handle is preferably extracted from the difference between the acceleration information and the average acceleration and is used as a differential acceleration. In this manner, the detection accuracy of the acceleration exerted on the toothbrush 4 by a brushing action can be enhanced.

The brushing manner evaluation unit 352 causes the storage unit of the control section 34 to cumulatively store the thus-obtained differential acceleration in chronological order (step S46). That is, when a user performs brushing, the differential acceleration indicating the movement of the toothbrush 4 in the brushing is cumulatively stored in the storage unit in chronological order. In this manner, movement of the toothbrush 4 in the predetermined time during the brushing, that is, the differential acceleration indicating a brushing action, is stored in the storage unit.

Then, a frequency component included in the cumulatively stored differential acceleration, that is, the brushing frequency indicating a frequency of back-and-forth movement of brushing, is analyzed by, for example, a fast Fourier transform (FFT) (step S51), and the range of brush movement is calculated from the brushing frequency and the differential acceleration (step S52). Specifically, an inverse number of the brushing frequency is a brushing cycle, and ½ of the brushing cycle indicates a time of one-way stroke in the back-and-forth movement of brushing. Thus, a travel speed of brushing can be obtained by multiplying ½ of the brushing cycle and the differential acceleration. In addition, the travel speed and the time of ½ of the brushing cycle are multiplied so that the range of brush movement in brushing, that is, a travel distance of a one-way stoke in the back-and-forth movement of the toothbrush, is calculated.

The thus-obtained range of brush movement serves as an index for evaluating brushing, and can be used as an evaluation result for changing an output mode of music with, for example, the music output unit 354 or the evaluation result is displayed on the touch panel display 32.

The calculation of the brushing frequency may employ various analysis techniques, and is not limited to the example using a fast Fourier transform. The thus-obtained brushing frequency may be reflected in a tempo of music played by the music playing unit 35. This enables the user to easily get into the rhythm in brushing.

Then, the brushing manner evaluation unit 352 causes the storage unit of the control section 34, for example, to cumulatively store the brushing frequency obtained in step S51, that is, the latest brushing frequency at the current time, in chronological order (step S53). That is, when a user performs brushing, the brushing frequency during this brushing, that is, the cycle of back-and-forth movement of the toothbrush 4, is cumulatively stored in the storage unit in chronological order.

Subsequently, the brushing manner evaluation unit 352 obtains, as a brushing cycle BC, the maximum frequency among the cumulatively stored brushing frequencies (step S54). The brushing cycle BC is an index indicating the speed of repetition of the back-and-forth movement in a brushing action of the user, and the maximum frequency is not necessarily the brushing cycle BC and may be an average value of cumulatively stored brushing frequencies.

In the brushing action of the user, however, an operation of quickly moving the brush back and forth is difficult unless the operation is intentionally performed. Thus, the maximum value of the brushing frequency that is the speed of repetitive back-and-forth movement tends to differ between a person who does not perform brushing well because of a lack of knowledge of an appropriate brushing method and a person who performs brushing well because the person knows an appropriate brushing method and tries to quickly moving the brush back and forth. Thus, the maximum frequency is suitable as a brushing cycle BC that is an index for evaluating a brushing action of a user.

Then, the brushing manner evaluation unit 352 searches for a maximum differential acceleration from accumulated data of differential accelerations stored in step S46 (step S55), and obtains the maximum differential acceleration as brushing speed information BS (step S56).

The brushing speed information BS is an index indicating a travel speed of the brush in a brushing action of the user. The maximum differential acceleration is not necessarily used as the brushing speed information BS, and an average value of differential accelerations cumulatively stored may be used, for example.

In the brushing operation of the user, however, an operation of quickly moving the brush back and forth is difficult unless the operation is intentionally performed. For this reason, the maximum value of the differential acceleration indirectly representing the travel speed of the brush in the back-and-forth movement tends to differ between a person who does not perform brushing well because of, for example, a lack of knowledge of an appropriate brushing method and a person who performs brushing well because the person knows an appropriate brushing method and tries to quickly move the brush back and forth. Thus, the maximum value of the differential acceleration is suitable as brushing speed information BS that is an index for evaluating a brushing action of the user.

Thereafter, the brushing manner evaluation unit 352 refers to the evaluation reference table stored in the storage unit. As described above, in the evaluation reference table, a frequency determination value indicating a predetermined frequency range by defining the upper limit and the lower limit is associated with brushing speed information corresponding to this frequency determination value. Based on the evaluation reference table, the brushing manner evaluation unit 352 searches for a frequency determination value including the brushing cycle BC, and obtains brushing speed information associated with the obtained frequency determination value, that is, brushing speed information associated with the frequency determination value corresponding to the brushing cycle BC, as best brushing speed information (step S57).

Then, the brushing manner evaluation unit 352 scores the skill of brushing by the user as a brushing quality in accordance with the quality evaluation criterion based on the best brushing speed information obtained in step S57 and the brushing speed information BS of the user (step S58). In this manner, the brushing manner evaluation unit 352 evaluates the skill of the brushing action based on a cycle of back-and-forth movement of the toothbrush and the travel speed of back-and-forth movement of the toothbrush.

Specifically, the quality evaluation criterion is defined in such a manner that the score decreases as the difference between an acceleration indicated by, for example, the best brushing speed information and an acceleration indicated by the brushing speed information BS increases; more specifically, if the difference is less than or equal to a reference value A (e.g., 0), the score is 100, if the difference is more than the reference value A and less than or equal to a reference value B, the score is 80, if the difference is more than the reference value B and less than or equal to a reference value C, the score is 60, and if the difference is more than the reference value C, the score is 40 (i.e., A<B<C).

Alternatively, the quality evaluation criterion may be defined in such a manner that the evaluation degrades as the difference between an acceleration indicated by, for example, the best brushing speed information and an acceleration indicated by the brushing speed information BS increases; more specifically, if the difference is less than or equal to a reference value A (e.g., 0), the evaluation is "BEST" if the difference is more than the reference value A and less than or equal to a reference value B, the evaluation is "GOOD," and if the difference is more than the reference value B, the evaluation is "BAD."

The thus-obtained evaluation result, that is, the brushing quality, serves as an index for evaluating brushing, and can be used as an evaluation result of brushing, such as an evaluation result for changing an output mode of music by, for example, the music output unit 354, or the evaluation result may be displayed on the touch panel display 32.

Figure 26:
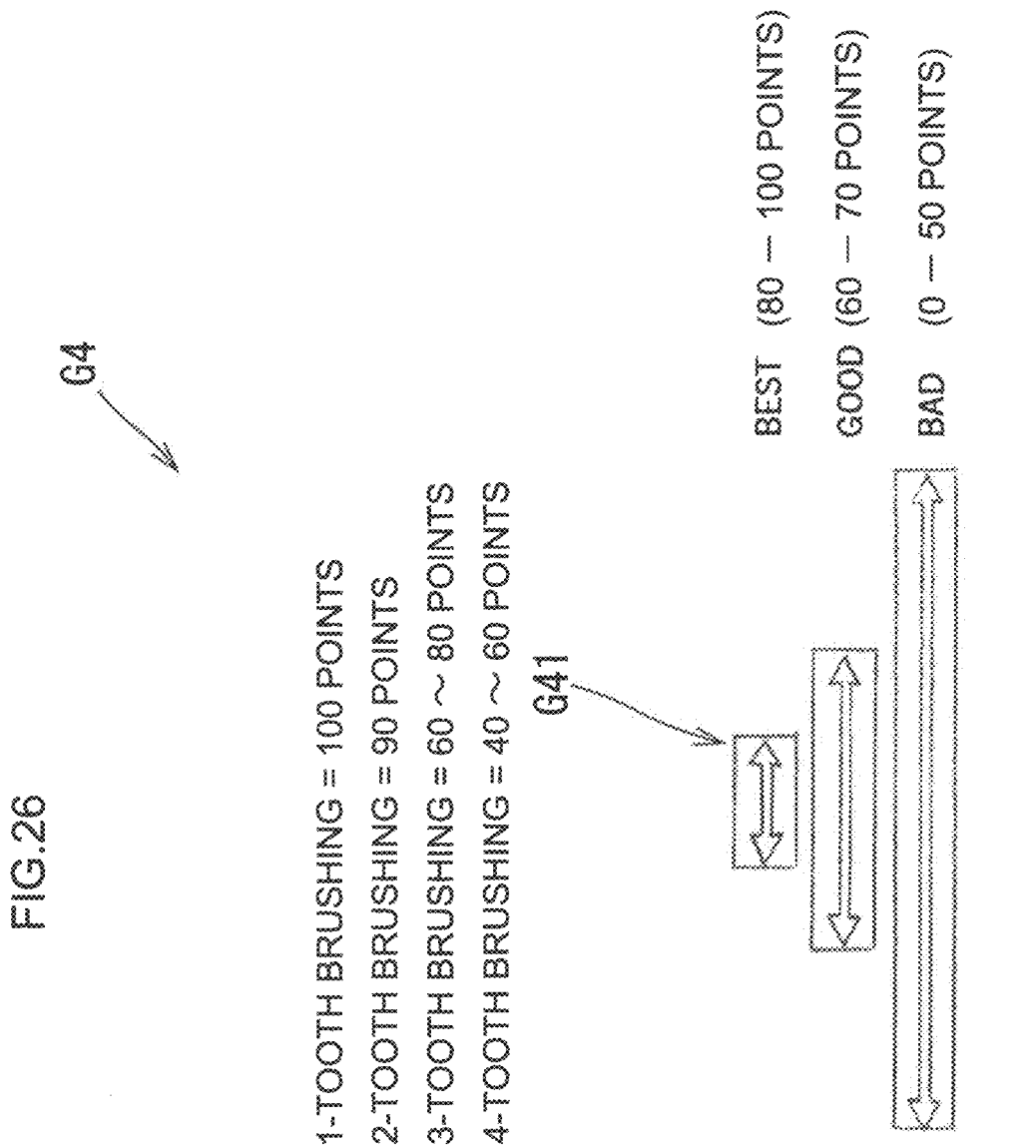
FIG. 26 is a screen view illustrating an example notification screen for displaying an evaluation result based on a range of movement of a brush on a touch panel display.

As the index for evaluating brushing, the range of brush movement calculated in step S52 may be used. FIG. 26 is a screen view illustrating an example notification screen G4 for displaying an evaluation result based on the range of brush movement on the touch panel display 32.

The brushing manner evaluation unit 352 evaluates the range of brush movement based on a predetermined brushing range evaluation criterion. The brushing range evaluation criterion may include a criterion for scoring the range of brush movement, and further include a criterion for evaluating the score, for example.

For example, the brushing manner evaluation unit 352 scores in units of, for example, 10 scores in accordance with the brushing range evaluation criterion based on a comparison with an average adult tooth width. The brushing range evaluation criterion is such that if the range of brush movement is less than or equal to the width of one tooth, the score is 100, if the range is greater than or equal to the width of one tooth and less than or equal to two teeth, the score is 90, if the range is greater than two teeth and less than or equal to three teeth, the score is 60 to 80, and if the range is greater than the width of three teeth and less than or equal to the width of four teeth, the score is 40 to 60.

The brushing manner evaluation unit 352 evaluates the score in three ranks of, for example, "BEST," "GOOD," and "BAD" in accordance with the brushing range evaluation criterion. As the brushing range evaluation criterion, the score for "BEST" is 80 to 100, the score for "GOOD" is 60 to 70, and the score for "BAD" is 0 to 50, for example.

Evaluation bars G41 illustrated in FIG. 26 consist of arrow images visually representing the ranges of brush movement, and indications representing the evaluation results "BEST," "GOOD," and "BAD." The brushing manner evaluation unit 352 causes the touch panel display 32 to display the evaluation bars G41 in accordance with a determination result of the score. The evaluation bar corresponding to "BEST" shows a short arrow, and expresses an image of brushing by moving the toothbrush back and forth in tiny strokes. As the evaluation result decreases to "GOOD" and then "BAD," the length of the arrow of the evaluation bar increases, which expresses an image of a wide range of toothbrush movement. In this manner, the evaluation bars G41 display, as a pair, an illustration of the range of toothbrush movement and an evaluation result of brushing, and thus, the user can know an evaluation result of his/her brushing action and can be notified that the user had better to reduce the range of toothbrush movement. As the evaluation result display image G42, the evaluation results of "BEST," "GOOD," and "BAD" and the score are directly displayed so that the user can be notified of an evaluation result of brushing with easy understanding.

Figure 27:
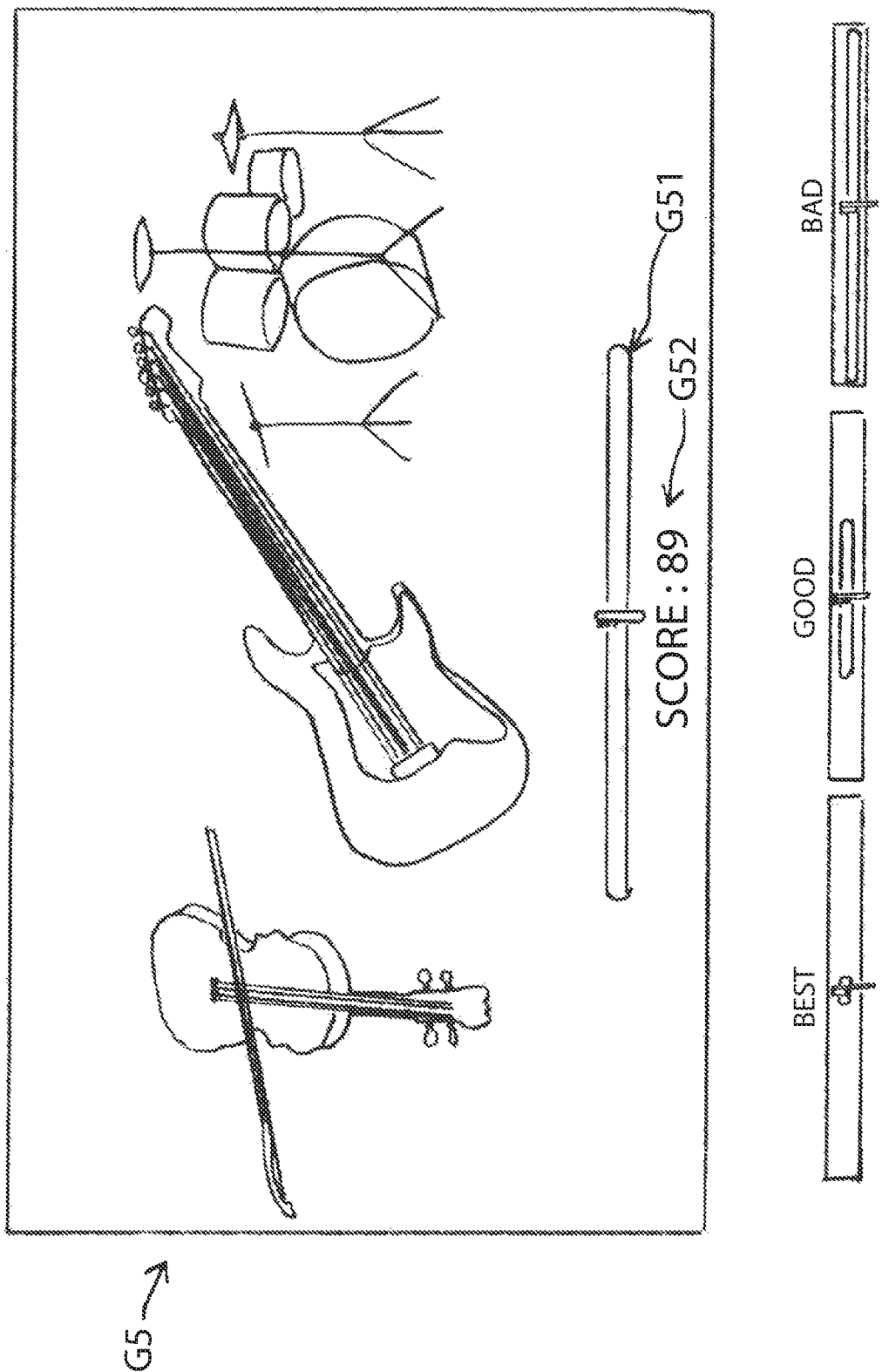
FIG. 27 is an example display screen displayed on a touch panel display by a music playing unit during brushing by a user.

The music playing unit 35 may be configured to display an evaluation result of brushing on the touch panel display 32 during brushing by the user. FIG. 27 is an example display screen displayed on the touch panel display 32 by the music playing unit 35 during brushing by the user. The display screen G5 illustrated in FIG. 27 displays an evaluation bar G51 substantially similar to the evaluation bars G41 illustrated in FIG. 26 and an evaluation score G52. In this manner, the user can know an evaluation result whether brushing is good or bad while enjoying the music.

Figure 28:
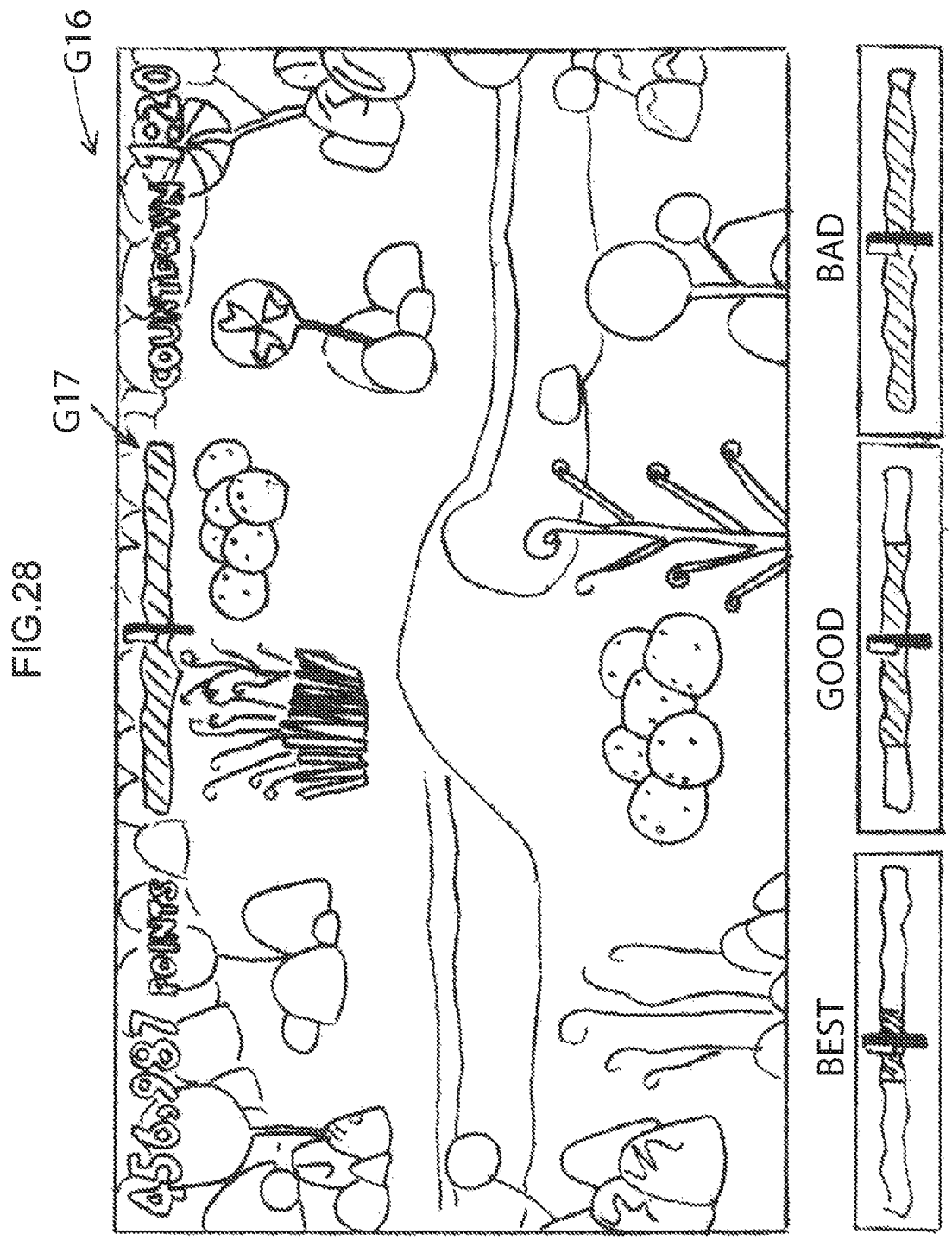
FIG. 28 is an example display screen displayed on a touch panel display by a game unit during brushing by a user.

The game unit 36 may be configured to display an evaluation result of brushing on the touch panel display 32 during a game, that is, brushing. FIG. 28 is an example display screen displayed on the touch panel display 32 by the game unit 36 during brushing by the user. The game screen G16 illustrated in FIG. 28 displays an evaluation bar G17 substantially similar to the evaluation bars G41 illustrated in FIG. 26. In this manner, the user can know an evaluation result whether brushing is good or bad while feeling as if the user plays a game.

The brushing timer unit 37 may be configured to display an evaluation result of brushing by, for example, displaying an evaluation bar in a manner substantially similar to the evaluation bars G41 illustrated in FIG. 26, for example, on, for example, the display screen of the touch panel display 32 illustrated in FIG. 20A, FIG. 20B and FIG. 20C. In this manner, the user can know an evaluation result whether brushing is good or bad while obtaining notification information during brushing.

The music playing unit 35, the game unit 36, and the brushing timer unit 37 may change the display screen displayed on the touch panel display 32 or change sound output from the speaker 33 in accordance with evaluation results such as the score of evaluation of the brushing quality or the score of evaluation based on the range of brush movement, for example.

The music playing unit 35, the game unit 36, and the brushing timer unit 37 may output sound that provides a favorable impression such as cheers from the speaker 33 or may display an image expressing praise on the touch panel display 32 when, for example, the score is as high as 80 or more or the range of brush movement corresponds to the width of one tooth or less. The music playing unit 35, the game unit 36, and the brushing timer unit 37 may output sound that provides an unfavorable impression such as booing from the speaker 33 or may display an image that provides an unfavorable impression on the touch panel display 32 when, for example, the sore is as low as 50 or less or the range of brush movement corresponds to the width of four teeth or more.

In the cases of low score, a warning such as "too much brushing", "too strong" may be displayed on the touch panel display 32 or output from the speaker 33 for notification. In this manner, it is possible to teach the user so that the user can learn a more appropriate brushing method.

The strictness of the brush manner evaluation may be changed in accordance with the target age of the game or the achieved level of brushing, or may be set by the user. Specifically, the strictness of the brushing manner evaluation may be changed by changing at least one of the brushing range evaluation criterion or the quality evaluation criterion. More specifically, the brushing manner evaluation becomes stricter, that is, the evaluation result tends to be low, by reducing the reference values A, B, and C of the quality evaluation criterion, the brush manner evaluation becomes stricter, that is, the evaluation result tends to be low, by reducing the score corresponding to the number of teeth in the brushing range evaluation criterion, and the brush manner evaluation becomes stricter, that is, the evaluation result tends to be low, by increasing the scores for determining evaluation results ("BEST," "GOOD," and "BAD") in the brushing range evaluation criterion. On the other hand, the brushing range evaluation criterion becomes less strict, that is, the evaluation result tends to be high, by increasing the reference values A, B, and C of the quality evaluation criterion, the brush manner evaluation becomes less strict, that is, the evaluation result tends to be high, by increasing the score corresponding to the number of teeth in the brushing range evaluation criterion, and the brush manner evaluation becomes less strict, that is, the evaluation result tends to be high, by reducing the scores for determining evaluation results ("BEST," "GOOD," and "BAD") in the brushing range evaluation criterion.

For example, at least one of the brushing range evaluation criterion or the quality evaluation criterion may be changed such that the game unit 36 can execute a plurality of games for various target ages such as children and adults, and the brushing manner evaluation unit 352 tends to evaluate higher for a lower target age, and evaluate lower for a higher target age. In this manner, it is possible to perform appropriate evaluation in accordance with the age of the user.

To improve brushing by a user, the evaluation is made strict in accordance with improvement of the user to promote further improvement. Specifically, based on the evaluation result stored in the storage unit, the brushing manner evaluation unit 352 may change at least one of the brushing range evaluation criterion or the quality evaluation criterion so that evaluation becomes stricter and tends to be low as the previous evaluation result is higher.

A known high-level brushing method is a method called a Bass method in which a brush is put on the boundary between the teeth and the gums at an angle of about 45 degrees while moving the brush back and forth in tiny strokes within the range of about 0.5 mm to 1 mm. To promote learning of such a high-level brushing method, the brushing range evaluation criterion and/or the quality evaluation criterion may be changed in such a manner that the determination accuracy of the brushing position by, for example, the brushing position determination unit 351 or 361 is increased so that the position at which brushing is performed can be specified in units of one tooth, and the evaluation result increases as brushing by the user approaches that of a high level brushing method as described above.

The duration of time of brushing by the user may be cumulatively counted. Since brushing by the user is assumed to improve as the cumulative time of the brushing increases, the control section 34 may display the cumulative time on the touch panel display 32 so that the degree of improvement of the brushing can be visualized.

As the toothbrush 4 deteriorates with use, cleaning performance of the brush decreases, and even if the user brushes in the same manner, actual brushing effect degrades. In view of this, the wireless terminal device 3 may include a timer unit that can detect replacement of the toothbrush 4 by receiving information on the replacement of the toothbrush 4 by, for example, a user's operation or by using a switch or a sensor provided in the toothbrush attachment 2 to detect detachment or attachment of the toothbrush 4 and that can thereby count a cumulative operating time from the time of replacement of the toothbrush 4. The brushing manner evaluation unit 352 may correct an evaluation result or change the brushing range evaluation criterion or the quality evaluation criterion so that the evaluation result degrades as the cumulative time increases.

Figure 23:
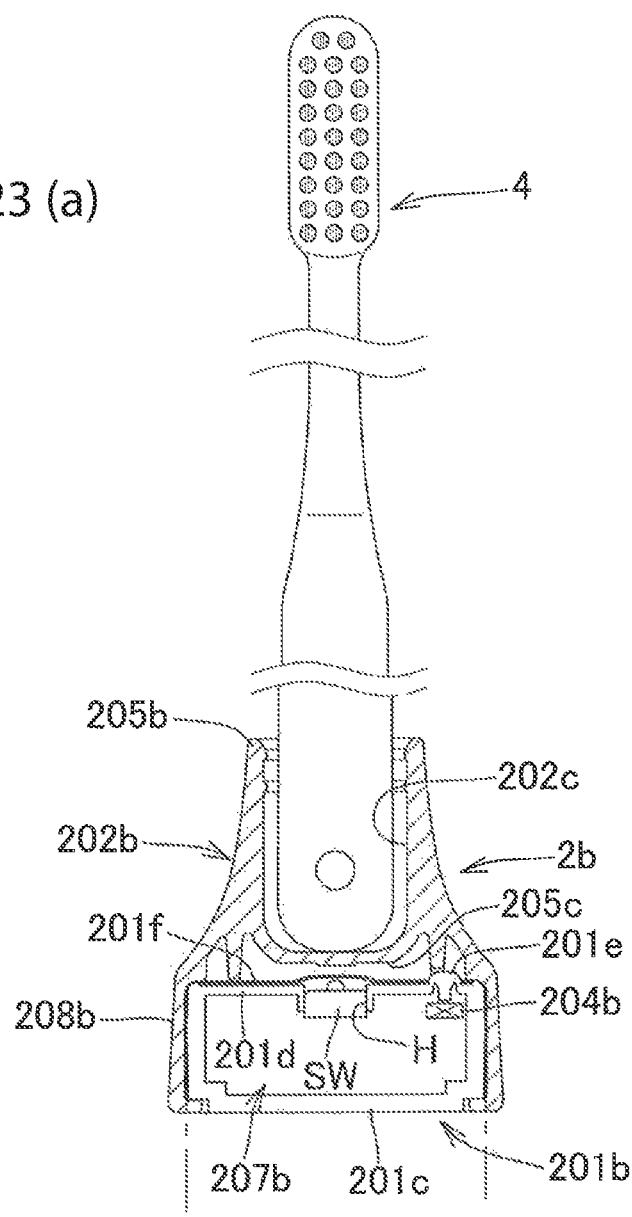
FIG. 23A and FIG. 23B are illustrations of another example of the toothbrush attachment illustrated in FIGS. 8 and 9.
Figure 23:
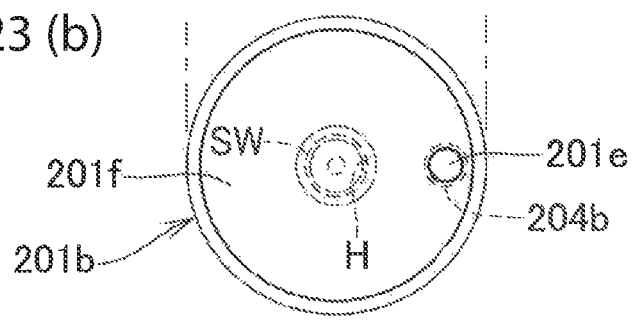
Figure 24:
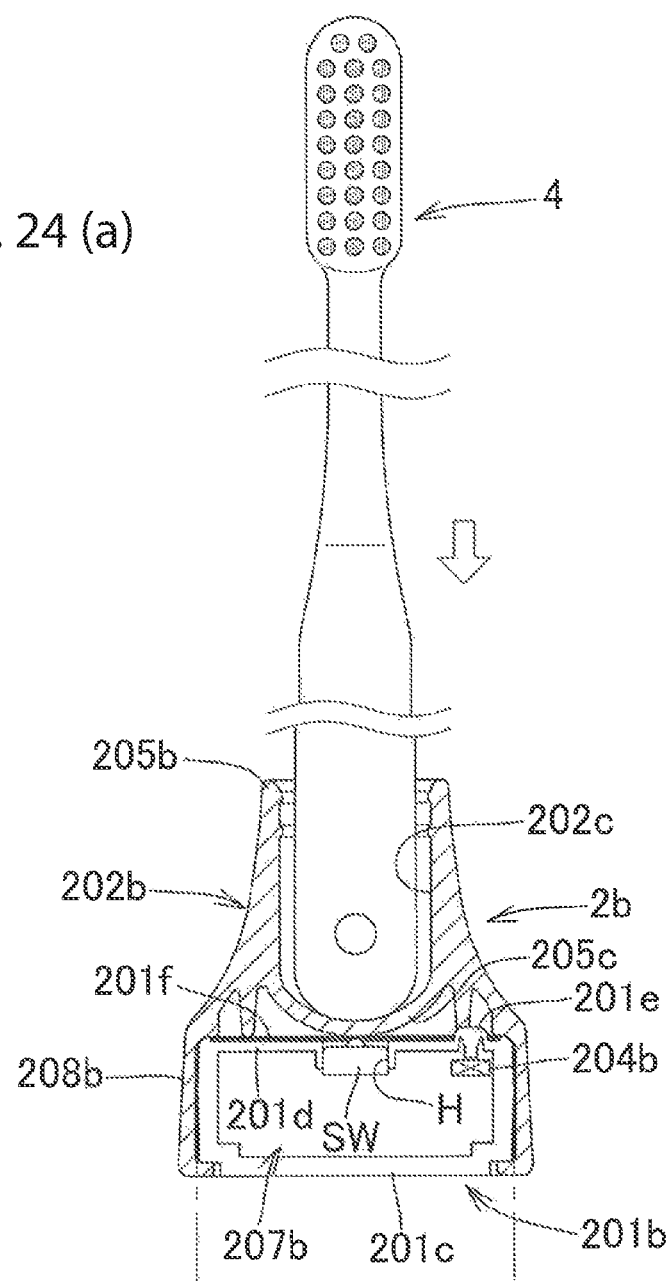
FIG. 24A and FIG. 24B are illustrations of another example of the toothbrush attachment illustrated in FIGS. 8 and 9.
Figure 24:
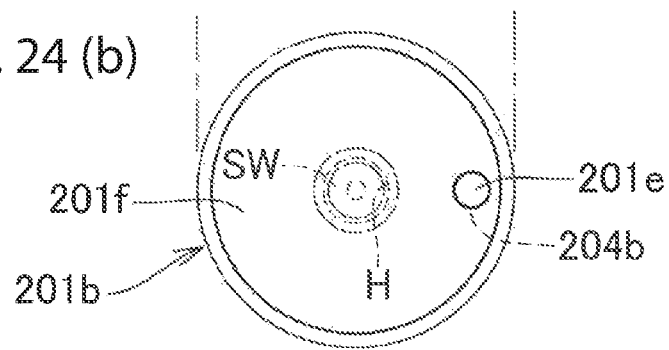

FIG. 23A, FIG. 23B, FIG. 24 A and FIG. 24B illustrate another example of the toothbrush attachment 2 illustrated in FIGS. 8 and 9. The state (a) in FIG. 23 is a state in which the toothbrush 4 is attached to a toothbrush attachment 2b. The state (b) in FIG. 23 is an upper view of a housing 201b seen from above. FIG. 24A and FIG. 24B are illustrations of a state in which the toothbrush 4 is pushed downward.

The toothbrush attachment 2b is different from the toothbrush attachment 2 illustrated in FIG. 9 in that an elastomer constituting a coupling mechanism 202b is made of a material that is semitransparent to light and in configurations of the housing 201b and a circuit block 207b. The coupling mechanism 202b includes a coupling frame 205b (holding unit) and a grip unit 208b. The inside of the grip unit 208b has a recess that receives the housing 201b. The coupling frame 205b has a cylindrical shape that can receive a rear end of the handle 41. The coupling frame 205b has an insertion hole 202c whose depth direction extends along an axial direction of the handle 41 so as to receive the rear end of the handle 41. The coupling frame 205b elastically holds the received handle 41 by using an elastic force of the elastomer. The coupling frame 205b holds the toothbrush 4 with the rear end of the handle 41 facing a power supply switch SW described later. The bottom of the insertion hole 202c is closed with a bottom part 205c.

Since the bottom of the insertion hole 202c is closed with the bottom part 205c, it is possible to prevent water in brushing from coming along the toothbrush 4 and entering the housing 201b placed in the circuit block 207b.

In other aspects, the toothbrush attachment 2b has a configuration similar to the toothbrush attachment 2 illustrated in FIG. 9. Thus, description thereof will not be repeated, and a distinctive configuration of the toothbrush attachment 2b will be described.

The housing 201b has a substantially cylindrical shape, for example, in a manner similar to the housing 201, and both ends of the housing 201b are closed with a bottom plate 201c and a top lid 201d, respectively. Specifically, the bottom plate 201c (bottom surface) and the top lid 201d (upper surface) are continuous through a side surface.

The top lid 201d is made of, for example, a resin material that transmits light, a hole H is formed at substantially the center of the top lid 201d, and a lens 201e is formed near the periphery of the top lid 201d. An elastic elastomer sheet 201f is attached to the upper surface of the top lid 201d to cover the hole H. The elastomer sheet 201f is disposed to avoid the lens 201e.

A push-button type power supply switch SW having a projection projecting upward from the body is disposed below the hole H formed in the outer wall of the housing 201b. The power supply switch SW is turned on when the projection is pushed in. The projection of the power supply switch SW projects upward from the hole H and lifts the elastomer sheet 201f covering the hole H. In this manner, the elastomer sheet 201f rises upward above the hole H.

An LED 204b is disposed below the lens 201e. When the LED 204b emits light, the light is caused to radiate outward from the housing 201b through the lens 201e and passes through the coupling mechanism 202b constituted by a semitransparent material so that light emission of the LED 204b can be recognized from outside the coupling mechanism 202b.

In FIG. 23A, FIG. 23B, FIG. 24A and FIG. 24B, components of the circuit block 207b except for the power supply switch SW and the LED 204b are not shown.

The coupling frame 205b holds the handle 41 so that the axial direction of the handle 41 is substantially perpendicular to the bottom surface at the upper surface side of the housing 201b received by the grip unit 208b. In this manner, the toothbrush attachment 2b can stand by itself on a flat place such as a table with the toothbrush 4 being attached to the toothbrush attachment 2b and the bottom plate 201c facing down. In this standing state, when the user pushes the toothbrush 4 downward, as illustrated in FIG. 24A and FIG. 24B, the bottom part 205c is pushed by the rear end of the toothbrush 4 to depress the projection of the power supply switch SW so that the power supply switch SW is turned on.

Figure 25:
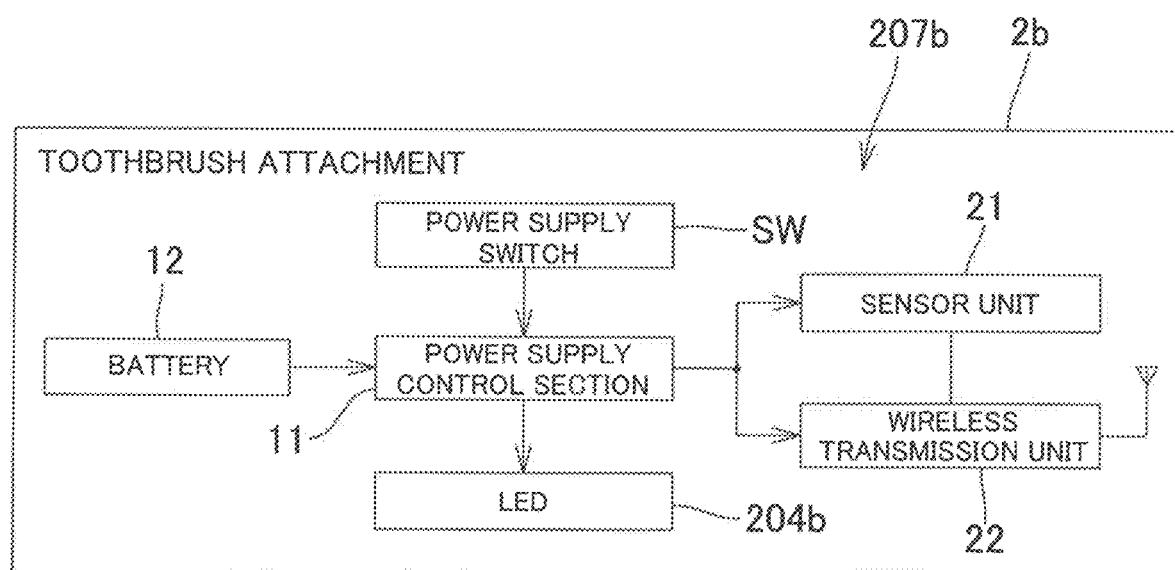
FIG. 25 is a block diagram illustrating an example electrical configuration of the toothbrush attachment illustrated in FIG. 23A and FIG. 23B.

FIG. 25 is a block diagram illustrating an example electrical configuration of the toothbrush attachment 2b illustrated in FIG. 23A and FIG. 23B. The toothbrush attachment 2b includes the sensor unit 21, the wireless transmission unit 22, a battery 12, the power supply switch SW (instruction reception unit), and a light emitting diode (LED) 204b. A power supply control section 11 is constituted by using a semiconductor switch circuit such as a transistor and a timer circuit, and when the power supply switch SW is turned on, supplies an operating power supply voltage from the battery 12 to the sensor unit 21, the wireless transmission unit 22, and the LED 204b. In this manner, the sensor unit 21 and the wireless transmission unit 22 start operating, that is, the circuit block 207 starts operating, and the LED 204b emits light.

The power supply switch SW corresponds to an example of the instruction reception unit that receives a pressing force as an instruction for starting an operation of the circuit block 207. The power supply control section 11 includes, for example, a timer circuit and, when a predetermined power-on period has elapsed from the start of power supply, stops power supply to the sensor unit 21, the wireless transmission unit 22, and the LED 204b. The power-on period is generally a period in which brushing can be finished, such as about 10 minutes.

The power supply control section 11 may monitor an output signal from the sensor unit 21, for example, so that when a state in which the output signal from the sensor unit 21 stops continues or a state in which no acceleration except a gravitational acceleration is detected by the sensor unit 21 continues for a predetermined time after the start of power supply, the power supply control section 11 stops power supply to the sensor unit 21, the wireless transmission unit 22, and the LED 204b.

In this manner, the user can start an operation of the toothbrush attachment 2b by a simple operation of pressing downward the self-standing toothbrush 4 attached to the toothbrush attachment 2b. In a case where the state in which an output signal from the sensor unit 21 stops continues or the state in which no acceleration except a gravitational acceleration is detected by the sensor unit 21 continues for the predetermined time after a lapse of the power-on period, power supply to the sensor unit 21 and the wireless transmission unit 22 stops. Thus, power consumption can be reduced.

DESCRIPTION OF REFERENCE NUMERALS AND SIGNS

1: brushing assistance system
2, 2b: toothbrush attachment
3: wireless terminal device (brushing assistance device)
4: toothbrush
5: charger
11: power supply control section
12: battery
21: sensor unit
22: wireless transmission unit
31: wireless receiver
32: touch panel display (display unit)
33: speaker
34: control section
35: music playing unit
36: game unit
37: brushing timer unit
41: handle
42: head
201, 201b: housing (housing unit)
201c: bottom plate
201d: top lid
201e: lens
201f: elastomer sheet
202, 202b: coupling mechanism
202c: insertion hole
203: bottom surface
205, 205b: coupling frame
205c: bottom part
206: elastic member
207, 207b: circuit block (toothbrush module)
208, 208b: grip unit
351: brushing position determination unit
352: brushing manner evaluation unit (evaluation unit)
353: music information storage unit
354: music output unit (sound output unit, output unit)
361: brushing position determination unit
362: cleaning effect evaluation unit (evaluation unit)
363: figure display control unit (output unit)
371: brushing start determination unit
372: timer unit
373: notification unit (output unit)
411: end
421: bristle tuft
A1, A2, A3, A4, A5: area
B1: song mode button
B2: free mode button
B3: save button
B4: share button
C: figure image
Ca: bubble image
CAM: camera
SW: power supply switch
G1: selection screen
G11: game screen
G12, G13: display screen
G14: game end screen
G15: score screen
G2: in-brushing screen
G21: user image
G21: start screen
G22: next button
G22: brushing position display image
G3: end screen
Sj: determination reference value
ST: start determination value
Sx: integrated value
tj: determination time
tp: elapsed time

The invention claimed is:

1. A toothbrush attachment comprising:
a toothbrush module including
a sensor that detects a predetermined physical quantity concerning a toothbrush, and
a wireless transmitter that transmits a radio signal indicating the physical quantity detected by the sensor;
an instruction receptor that receives a pressing force as a start instruction for starting an operation of the toothbrush module;
a housing that houses the sensor and the wireless transmitter; and
a coupling mechanism that removably attaches the housing to the toothbrush; wherein:
the coupling mechanism is constituted by an elastomer; and
the elastomer constitutes
a recess that receives the housing therein, and
a holder that is capable of receiving a proximal end of the handle and elastically holds the received handle with an elastic force of the elastomer,
the housing has a flat bottom surface, an upper surface opposite to the bottom surface, and a side surface connecting the bottom surface and the upper surface to each other,
the recess is formed to receive the housing so that the elastomer covers a whole surface that includes the upper surface of the housing and a widest surface of the side surface of the housing and the housing is held with the elastic force of the elastomer, the instruction receptor is disposed on the upper surface, and the holder holds the handle at the upper surface of the housing received by the recess so that an axial direction of the handle is perpendicular to the bottom surface.

2. A brushing assistance system comprising:

a toothbrush attachment including:
- a toothbrush module including
  - a sensor that detects a predetermined physical quantity concerning a toothbrush, and
  - a wireless transmitter that transmits a radio signal indicating the physical quantity detected by the sensor;
- a housing that houses the sensor and the wireless transmitter; and
- a coupling mechanism that removably attaches the housing to the toothbrush; and a wireless terminal that receives the radio signal and includes
- a wireless receiver that receives the radio signal and obtains the physical quantity, and
- a sound outputter that outputs sound based on the physical quantity so as to support brushing by a user with the toothbrush; and a brushing manner evaluator that evaluates the brushing based on the physical quantity; wherein the sound outputter includes
- a music information storage that stores music information representing music, and
- a music outputter that outputs the music based on the music information stored in the music information storage; and
- the music outputter outputs the music if an evaluation result obtained by the brushing manner evaluator is within a predetermined range, and outputs the music with deviated tones, a disturbed harmony, or a disturbed rhythm, if the evaluation result is not within the predetermined range.

* * * * *